(12) United States Patent
Tang et al.

(10) Patent No.: US 11,348,217 B2
(45) Date of Patent: May 31, 2022

(54) PROJECTOR, DETECTION METHOD THEREOF, AND ELECTRONIC DEVICE

(71) Applicant: GUANGDONG OPPO MOBILE TELECOMMUNICATIONS CORP., LTD., Guangdong (CN)

(72) Inventors: Cheng Tang, Guangdong (CN); Guohui Tan, Guangdong (CN); Zhihua Tian, Guangdong (CN); Haitao Zhou, Guangdong (CN); Xiao Tan, Guangdong (CN); Jian Bai, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 97 days.

(21) Appl. No.: 16/684,299

(22) Filed: Nov. 14, 2019

(65) Prior Publication Data
US 2020/0082520 A1   Mar. 12, 2020

Related U.S. Application Data

(63) Continuation of application No. PCT/CN2019/075386, filed on Feb. 18, 2019.

(30) Foreign Application Priority Data

Mar. 12, 2018  (CN) .......................... 201810200820.3
Apr. 28, 2018  (CN) .......................... 201810402208.4
(Continued)

(51) Int. Cl.
*G06T 7/00*       (2017.01)
*G06T 7/521*      (2017.01)
(Continued)

(52) U.S. Cl.
CPC ............ *G06T 7/0002* (2013.01); *G06T 7/521* (2017.01); *G06V 10/145* (2022.01);
(Continued)

(58) Field of Classification Search
CPC .................. G06T 7/0002; G06T 7/521; G06T 2207/10028; G06T 2207/10048;
(Continued)

(56) References Cited

U.S. PATENT DOCUMENTS 9,208,566 B2 * 12/2015 Chen ..................... G06F 3/0346
9,366,946 B2 *  6/2016 Kurashige ................ G02B 5/32
(Continued)

FOREIGN PATENT DOCUMENTS

CN         1724969        1/2006
CN       101872329       10/2010
(Continued)

OTHER PUBLICATIONS

EPO, Office Action for EP Application No. 19736569.5, dated Jun. 25, 2020.
(Continued)

*Primary Examiner* — Gregory M Desire
(74) *Attorney, Agent, or Firm* — Hodgson Russ LLP

(57) ABSTRACT

The present disclosure provides a detection method of a projector, a projector, and an electronic device. The method includes: obtaining a speckle pattern, the speckle pattern being an image generated by irradiating laser light generated by a light source in the projector onto an object by an optical element; and performing an abnormality detection on the projector according to the speckle pattern.

18 Claims, 16 Drawing Sheets

(30) Foreign Application Priority Data

| Apr. 28, 2018 | (CN) | 201810403817.1 |
|---|---|---|
| Apr. 28, 2018 | (CN) | 201810403826.0 |
| Apr. 28, 2018 | (CN) | 201810404506.7 |

(51) Int. Cl.

| *H04N 5/225* | (2006.01) |
|---|---|
| *G06V 10/145* | (2022.01) |
| *G06V 10/98* | (2022.01) |
| *G06V 40/16* | (2022.01) |

(52) U.S. Cl.
CPC .......... *G06V 10/993* (2022.01); *G06V 40/172* (2022.01); *H04N 5/2256* (2013.01); *G06T 2207/10028* (2013.01); *G06T 2207/10048* (2013.01); *G06T 2207/30201* (2013.01)

(58) Field of Classification Search
CPC ...... G06T 2207/30201; G06K 9/00288; G06K 9/036; G06K 9/2036; H04N 5/2256
See application file for complete search history.

(56) References Cited

U.S. PATENT DOCUMENTS

| 10,210,381 | B1 * | 2/2019 | Mostafa | G06F 21/32 |
|---|---|---|---|---|
| 10,401,631 | B2 * | 9/2019 | Ukai | G02F 1/1335 |
| 10,852,246 | B2 * | 12/2020 | Kim | G01N 21/9505 |
| 11,143,879 | B2 * | 10/2021 | Sapienza | G06T 7/593 |
| 2011/0114857 | A1 | 5/2011 | Akerman et al. | |
| 2016/0371845 | A1 | 12/2016 | Yasovsky et al. | |
| 2019/0012784 | A1 * | 1/2019 | Wiley | A61B 3/111 |
| 2019/0295271 | A1 | 9/2019 | Xu et al. | |
| 2020/0082520 | A1 * | 3/2020 | Tang | G01N 21/958 |

FOREIGN PATENT DOCUMENTS

| CN | 102025901 | 4/2011 |
|---|---|---|
| CN | 102236896 | 11/2011 |
| CN | 102288622 | 12/2011 |
| CN | 102081045 | 2/2012 |
| CN | 102970548 | 3/2013 |
| CN | 103268608 | 8/2013 |
| CN | 103149217 | 6/2015 |
| CN | 105959659 | 9/2016 |
| CN | 106296716 | 1/2017 |
| CN | 106529545 | 3/2017 |
| CN | 107241548 | 10/2017 |
| CN | 107341481 | 11/2017 |
| CN | 107402215 | 11/2017 |
| CN | 107424187 | 12/2017 |
| CN | 107608167 | 1/2018 |
| CN | 107688024 | 2/2018 |
| CN | 107783361 | 3/2018 |
| CN | 107884157 | 4/2018 |
| CN | 107911584 | 4/2018 |
| CN | 107968858 | 4/2018 |
| CN | 107968865 | 4/2018 |
| CN | 108490629 | 9/2018 |
| CN | 108600740 | 9/2018 |
| CN | 108716982 | 10/2018 |
| CN | 108716983 | 10/2018 |
| CN | 108760245 | 11/2018 |
| TW | 201112740 | 4/2011 |
| WO | 2013188520 | 3/2014 |
| WO | 2017009808 | 1/2017 |

OTHER PUBLICATIONS

EPO, Office Action for EP Application No. 19736569.5, dated Mar. 17, 2020.
SIPO, Decision on Rejection for CN Application No. 201810402208.4, dated May 30, 2019.
TIPO, Office Action for TW Application No. 108108335, dated Mar. 30, 2020.
IPIN, Office Action for IN Application No. 201917027562, dated Mar. 16, 2021.
SIPO, First Office Action for CN Application No. 201810200820, dated May 7, 2019.
SIPO, First Office Action for CN Application No. 201810402208, dated Mar. 20, 2019.
SIPO, First Office Action for CN Application No. 201810403826, dated Feb. 22, 2019.
SIPO, First Office Action for CN Application No. 201810404506, dated Feb. 22, 2019.
WIPO, English Translation of the ISR and WO for PCT/CN2019/075386, dated May 9, 2019.
SIPO, First Office Action for CN Application No. 201810403817.1, dated May 24, 2019.
TIPO, Office Action for TW Application No. 108108335, dated Oct. 18, 2019.
EPO, Communication for EP Application No. 19736569.5, dated Jan. 24, 2022.

* cited by examiner

PROJECTOR, DETECTION METHOD THEREOF, AND ELECTRONIC DEVICE

CROSS-REFERENCE TO RELATED APPLICATIONS

This application is a continuation application of International Application No. PCT/CN2019/075386, filed on Feb. 18, 2019, which claims priority to Chinese Patent Application No. 201810200820.3, filed on Mar. 12, 2018, and Chinese Patent Application Nos. 201810403817.1, 201810402208.4, 201810403826.0 and 201810404506.7, each filed on Apr. 28, 2018. The entire disclosures of the aforementioned applications are incorporated herein by reference.

TECHNICAL FIELD

The present disclosure relates to a field of computer technology, and more particularly, to a detection method of a projector, a projector, and an electronic device.

BACKGROUND

With the development of computer technology, the depth image technology is widely used in scenes such as face recognition, human-computer interaction and image beautification. A depth image is calculated from a speckle pattern generated by irradiating laser light generated by a light source in a projector onto an object through an optical element.

SUMMARY

Embodiments of the present disclosure provide a detection method of a projector, a projector, and an electronic device.

A detection method of a projector includes obtaining a speckle pattern, the speckle pattern being an image generated by irradiating laser light generated by a light source in the projector onto an object through an optical element, and performing an abnormality detection on the projector according to the speckle pattern.

A projector includes a light source, a collimating element, an optical element and a processor. The light source is configured to emit laser light. The collimating element is configured to collimate the laser light. The optical element is configured to diffract the laser light collimated by the collimating element to generate a speckle pattern. The processor is configured to determine whether a face verification is successful, to obtain the speckle pattern when the face verification is unsuccessful, to determine whether a brightness of a central region of the speckle pattern is within a preset brightness range, and to determine that the projector is abnormal when the brightness of the central region is beyond the preset brightness range.

An electronic device includes a memory and a processor. The memory stores a computer program. When the computer program is executed by the processor, the processor is caused to perform the above detection method of a projector.

BRIEF DESCRIPTION OF THE DRAWINGS

In order to more clearly illustrate the embodiments of the present disclosure or the technical solutions in the related art, the drawings used in the embodiments or the related art will be briefly described below. Obviously, the drawings in the following description are only certain embodiments of the present disclosure, and other drawings can be obtained according to the drawings by those skilled in the art, without inventive work.

DETAILED DESCRIPTION

In order to make the objects, technical solutions and advantages of the present disclosure more comprehensible, the present disclosure will be further described in detail below with reference to the accompanying drawings and embodiments. Embodiments described herein with reference to drawings are explanatory, serve to explain the present disclosure, and are not construed to limit embodiments of the present disclosure.

It should be understood that the terms "first", "second" and the like, as used herein, may be used to describe various elements, but these elements are not limited by these terms. These terms are only used to distinguish one element from another. For example, a first client may be referred to as a second client, and similarly, a second client may be referred to as a first client, without departing from the scope of the present disclosure. Both the first client and the second client are clients, but they are not the same client.

Figure 1:
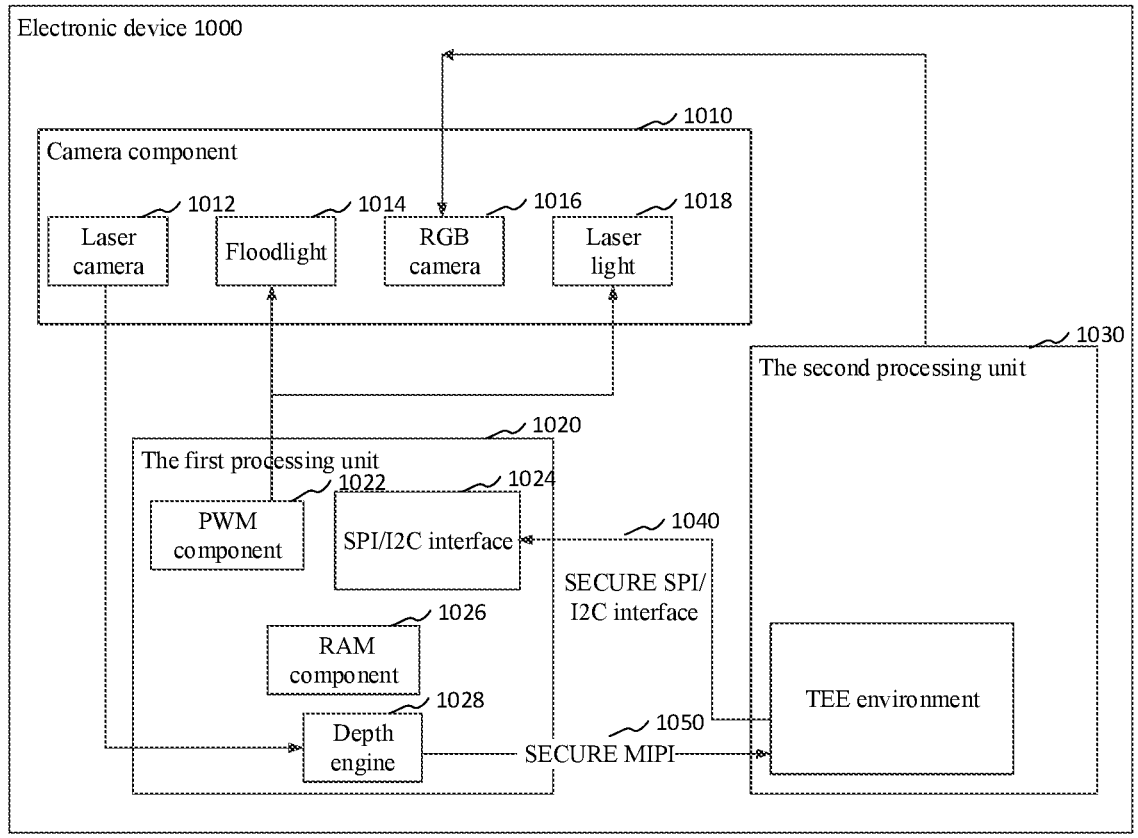
FIG. 1 is a schematic diagram of an application scenario of a detection method of a projector according to an embodiment of the present disclosure.

FIG. 1 is a schematic diagram of an application scenario of a detection method of a projector according to an embodiment of the present disclosure. As illustrated in FIG. 1, the electronic device 1000 may include a camera component 1010, a first processing unit 1020 and a second processing unit 1030. The second processing unit 1030 may be a CPU (Central Processing Unit). The first processing unit 1020 may be an MCU (Microcontroller Unit) or the like. The first processing unit 1020 is coupled between the second processing unit 1030 and the camera component 1010. The first processing unit 1020 can control a laser camera 1012, a floodlight 1014 and a laser light 1018 in the camera component 1010. The second processing unit 1030 can control a RGB (Red/Green/Blue) camera 1016 in the camera component 1010.

The camera component 1010 includes the laser camera 1012, the floodlight 1014, the RGB camera 1016 and the laser light 1018. The laser camera 1012 is an infrared camera for obtaining an infrared image. The floodlight 1014 is a surface light source capable of generating infrared light. The laser light 1018 is a point light source capable of generating laser light and may be a patterned point light source. When the floodlight 1014 emits a surface light source, the laser camera 1012 can obtain an infrared image according to reflected light. When the laser light 1018 emits a point light source, the laser camera 1012 can obtain a speckle pattern according to the reflected light. The speckle pattern described above is an image in which the patterned point light source emitted by the laser light 1018 is deformed.

The first processing unit 1020 includes a PWM (Pulse Width Modulation) module 1022, a SPI/I2C (Serial Peripheral Interface/Inter-Integrated Circuit) interface 1024, a RAM (Random Access Memory) module 1026 and a depth engine 1028. The PWM module 1022 transmits pulses to the camera component, and controls the floodlight 1014 or the laser light 1018 to be turned on, thus causing the laser camera 1012 to obtain an infrared image or a speckle pattern. The SPI/I2C interface 1024 is configured to receive a face acquisition command sent by the second processing unit 1030. The depth engine 1028 described above can process the speckle pattern to obtain a depth disparity map.

When the second processing unit 1030 receives a data acquisition request from an application, for example, when the application needs to perform face unlocking or face payment, a face acquisition command may be sent to the first processing unit 1020 by a CPU core running in a TEE environment. When the first processing unit 1020 receives the face acquisition command, the PWM module 1022 can transmit pulse waves to control the floodlight 1014 in the camera component 1010 to be turned on and collect the infrared image through the laser camera 1012, and control the laser light 1018 in the camera component 1010 to be turned on and collect the speckle pattern through the laser camera 1012. The camera component 1010 can transmit the collected infrared image and speckle pattern to the first processing unit 1020. The first processing unit 1020 may process the received infrared image to obtain an infrared disparity map, and process the received speckle pattern to obtain a speckle disparity map or a depth disparity map. The processing of the infrared image and the speckle pattern by the first processing unit 1020 includes correcting the infrared image or the speckle pattern, and removing an influence of internal and external parameters of the camera component 1010 on the image. The first processing unit 1020 can be set to different modes, and different images are output under different modes. When the first processing unit 1020 is set to a speckle pattern mode, the first processing unit 1020 processes the speckle pattern to obtain the speckle disparity map, and a target speckle pattern can be obtained according to the speckle disparity map. When the first processing unit 1020 is set to a depth image mode, the first processing unit 1020 processes the speckle pattern to obtain a depth disparity map, and a depth image can be obtained according to the depth disparity map, and the depth image refers to an image with depth information. The first processing unit 1020 may send the infrared disparity map and the speckle disparity map to the second processing unit 1030, and the first processing unit 1020 may send the infrared disparity map and the depth disparity map to the second processing unit 1030. The second processing unit 1030 may obtain a target infrared image according to the infrared disparity map, and obtain a depth image according to the depth disparity map. In addition, the second processing unit 1030 may perform a face recognition, face matching and bio-assay, and obtain depth information of a detected face according to the target infrared image and the depth image.

The first processing unit 1020 and the second processing unit 1030 communicates through a fixed security interface to ensure security of transmitted data. As illustrated in FIG. 1, the second processing unit 1030 sends data to the first processing unit 1020 through a SECURE SPI/I2C interface 1040. The data is sent by the first processing unit 1020 to the second processing unit 1030 via the SECURE MIPI (Mobile Industry Processor Interface) 1050.

In one embodiment, the first processing unit 1020 controls the laser light 1018 in the camera component 1010 to be turned on, and collects the speckle pattern through the laser camera 1012. The camera component 1010 can send the collected speckle pattern to the first processing unit 1020, and the first processing unit 1020 can perform an abnormality detection on the projector according to the obtained speckle pattern.

In one embodiment, the second processing unit 1030 receives a camera startup request from the application and may send an image acquisition command to the first processing unit 1020. The first processing unit 1020 controls the laser light 1018 in the camera component 1010 to be turned on and collects the speckle pattern through the laser camera 1012. The camera component 1010 can send the collected speckle pattern to the first processing unit 1020, and the first processing unit 1020 can perform an abnormality detection on the optical element according to the obtained speckle pattern.

In an embodiment, the first processing unit 1020 may further obtain an infrared image collected by the camera component 1010, and the second processing unit 1030 may perform a face recognition according to the above infrared image. When the face recognition is successful, the second processing unit 1030 performs a bio-assay according to the speckle pattern, and when the bio-assay is successful, the first processing unit 1020 can perform an abnormality detection on the optical element according to the obtained speckle pattern.

In one embodiment, the first processing unit 1020 controls the laser light 1018 in the camera component 1010 to be turned on and collects the speckle pattern through the laser camera 1012. The camera component can send the collected speckle pattern to the first processing unit 1020. The first processing unit 1020 can obtain a region with a maximum brightness in the speckle pattern, i.e., a zero-order region, and an average brightness of the zero-order region, according to the obtained speckle pattern. The first processing unit 1020 can also detect an average brightness of a peripheral region of the zero-order region in the speckle pattern. When a ratio of the average brightness of the zero-order region to the average brightness of the peripheral region of the zero-order region is greater than a first threshold, it is determined that the optical element is abnormal.

In one embodiment, the first processing unit 1020 controls the floodlight 1014 and the laser light 1018 in the camera component 1010 to be turned on and collects corresponding infrared image and speckle pattern through the laser camera 1012, and the camera component 1010 can send the collected infrared image and speckle pattern to the first processing unit 1020. The first processing unit 1020 can obtain a region with a maximum brightness in the speckle pattern, i.e. a first zero-order region, and an average brightness of the first zero-order region according to the speckle pattern, and detect an average brightness of a first peripheral region of the first zero-order region in the speckle pattern. The first processing unit 1020 may further obtain an average brightness of a second zero-order region in the infrared image corresponding to the first zero-order region of the speckle pattern and an average brightness of a second peripheral region in the infrared image corresponding to the first peripheral region in the speckle pattern. When a ratio of the average brightness of the first zero-order region to that of the first peripheral region is greater than a first preset value and a zero-order region ratio is greater than a peripheral region ratio, the first processing unit 1020 determines that the optical element is abnormal. The zero-order region ratio is a ratio of the average brightness of the first zero-order region to that of the second zero-order region, and the peripheral region ratio is a ratio of the average brightness of the first peripheral region to that of the second peripheral region.

In one embodiment, the first processing unit 1020 controls the laser light 1018 in the camera component 1010 to be turned on and collects the speckle pattern through the laser camera 1012. The camera component 1010 can send the collected speckle pattern to the first processing unit 1020. The first processing unit 1020 may obtain, according to the obtained speckle pattern, a region with a maximum brightness in the speckle pattern, i.e., a zero-order region, and detect an average of brightnesses of scattered speckles in the zero-order region. When the average of the brightnesses of the scattered speckles is greater than a preset brightness value, it is determined that the optical element is abnormal.

It is appreciated that the abnormality of the projector includes an abnormality of the optical element, and the abnormality of the optical element can be regarded as the abnormality of the projector.

The electronic device in the embodiments of the present disclosure may be a mobile phone, a tablet computer, a personal digital assistant or a wearable device, or the like.

In other embodiments, the electronic device may include the camera component 1010 and the second processing unit 1030.

Figure 2:
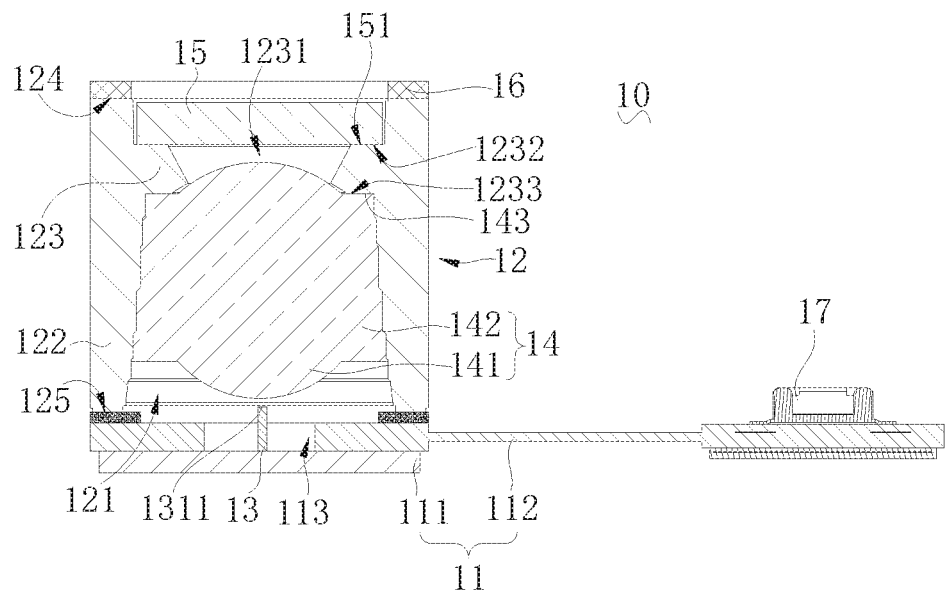
FIGS. 2 to 5 are schematic structural diagrams of a projector according to embodiments of the present disclosure.

As illustrated in FIG. 2, the projector 10 (e.g. a structured light projector 10) may be the laser light 1018. The projector includes a substrate assembly 11, a lens barrel 12, a light source 13, a collimating element 14 and an optical element 15 (e.g. a diffractive optical element 15). The light source 13, the collimating element 14 and the optical element 15 are sequentially disposed on a light path of the light source 13. The light emitted by the light source 13 passes through the collimating element 14 and the optical element 15 in sequence.

The substrate assembly 11 includes a substrate 111 and a circuit board 112 carried on the substrate 111. The substrate 111 is configured to carry the lens barrel 12, the light source 13 and the circuit board 112. The material of the substrate 111 may be plastic, such as at least one of polyethylene glycol terephthalate (PET), polymethyl methacrylate (PMMA), polycarbonate (JPC) and polyimide (PI). In other words, the substrate 111 can be made of a single plastic material of any one of PET, PMMA, PC and PI. As such, the substrate 111 is lighter in weight and has sufficient support strength.

The circuit board 112 may be any one of a printed circuit board, a flexible circuit board, and a soft and hard board. The circuit board 112 may be provided with a via hole 113. The via hole 113 is configured to accommodate the light source 13. A part of the circuit board 112 is covered by the lens barrel 12, and the other part is extended from the lens barrel 12 and coupled to a connector 17. The connector 17 is configured to couple the projector 10 to other electronic elements (e.g. a main board of the electronic device 1000 illustrated in FIG. 1).

The lens barrel 12 is disposed on the substrate assembly 11 and forms a receiving cavity 121 together with the substrate assembly 11. In detail, the lens barrel 12 can be coupled to the circuit board 112 of the substrate assembly 11, the lens barrel 12 and the circuit board 112 can be bonded by adhesive to improve airtightness of the receiving cavity 121. The lens barrel 12 and the substrate assembly 11 may be coupled in other manners, for example, through a snap connection. The receiving cavity 121 is configured to accommodate components such as the collimating element 14, the optical element 15, and the receiving cavity 121 simultaneously forms a part of the light path of the projector 10. In the embodiments of the present disclosure, the lens barrel 12 has a hollow cylindrical shape, and the lens barrel 12 includes a sidewall 122 and a limiting protrusion 123.

The sidewall 122 of the lens barrel 12 encloses the receiving cavity 121, and an outer wall of the sidewall 122 of the lens barrel 12 may be formed with a positioning structure and a mounting structure to facilitate installation of the projector 10 (e.g. at a predetermined position within the electronic device 1000). The lens barrel 12 includes a first surface 124 and a second surface 125 opposed to each other, an opening of the receiving cavity 121 is opened on the second surface 125 and another opening is opened on the first surface 124. The second surface 125 is bonded to the circuit board 112, for example, by gluing.

As illustrated in FIG. 2, the limiting protrusion 123 protrudes inwardly from the sidewall 122 of the lens barrel. In detail, the limiting protrusion 123 protrudes from the sidewall 122 of the lens barrel into the receiving cavity 121. The limiting protrusions 123 may be continuous annular, or there may be a plurality of limiting protrusions 123. The plurality of limiting protrusions 123 are spaced apart. The limiting protrusion 123 may be used to form a light passing hole 1231. The light passing hole 1231 can serve as a part of the receiving cavity 121. The laser light passes through the light passing hole 1231 and enters the optical element 15. The limiting protrusion 123 includes a first limiting surface 1232 and a second limiting surface 1233. The first limiting surface 1232 is opposite to the second limiting surface 1233. In detail, the limiting protrusion 123 is located between the first surface 124 and the second surface 125. The first limiting surface 1232 is closer to the first surface 124 than the second limiting surface 1233. The first limiting surface 1232 and the second limiting surface 1233 can be parallel planes. The receiving cavity 121 between the first limiting surface 1232 and the first surface 124 is configured to accommodate the optical element 15. The receiving cavity 121 between the second limiting surface 1233 and the second surface 125 is configured to accommodate the collimating element 14.

The light source 13 is disposed on the substrate assembly 11. In detail, the light source 13 can be disposed on the circuit board 112 and electrically connected to the circuit board 112. The light source 13 can also be disposed on the substrate 111 and received in the via hole 113. In this case, the light source 13 is electrically coupled to the circuit board 112 by arranging wires. The light source 13 is configured to emit laser light, and the laser light may be infrared light. In one example, the light source 13 may include a semiconductor substrate and an emitting laser disposed on the semiconductor substrate. The semiconductor substrate is disposed on the substrate 111, and the emitting laser may be a vertical cavity surface emitting laser (VCSEL). The semiconductor substrate may be provided with a single emitting laser, or an array laser composed of a plurality of emitting lasers. In detail, the plurality of emitting lasers may be arranged on the semiconductor substrate in a regular or irregular two-dimensional pattern.

The collimating element 14 can be an optical lens, the collimating element 14 is configured to collimate the laser light emitted by the light source 13, the collimating element 14 is received in the receiving cavity 121, and the collimating element 14 can be assembled into the receiving cavity 121 in a direction along the second surface 125 towards the first surface 124. In detail, the collimating element 14 includes a bonding surface 143. When the bonding surface 143 is combined with the second limiting surface 1233, the collimating element 14 can be considered to be installed in place. The collimating element 14 includes an optical portion 141 and a mounting portion 142. The mounting portion 142 is configured to engage with the sidewall 122 of the lens barrel to fix the collimating element 14 in the receiving cavity 121. In the embodiments of the present disclosure, the bonding surface 143 is an end face of the mounting portion 142, the optical portion 141 includes two curved surfaces on opposite sides of the collimating element 14. One of the curved surfaces of the collimating element 14 extends into the light passing hole 1231.

The optical element 15 is mounted on the limiting protrusion 123. In detail, the optical element 15 includes a mounting surface 151, the mounting surface 151 is combined with the first limiting surface 1232 to mount the optical element 15 on the limiting protrusion 123. A certain area on the mounting surface 151 may be formed with a diffractive structure, and the diffractive structure may correspond to the position of the light passing hole 1231 and diffract the laser light collimated by the collimating element 14 into a laser pattern corresponding to the diffractive structure (the laser pattern is also referred to as the speckle pattern), other areas on the mounting surface 151 may be planar and combined with the first limiting surface 1232. The optical element 15 can be made of glass or composite plastics such as PET.

As illustrated in FIG. 2, in some embodiments, the projector 10 further includes a protective cover 16 that is disposed on the first surface 124. The side of the optical element 15 opposite to the mounting surface 151 is in contact with the protective cover 16. After the optical element 15 is mounted on the limiting protrusion 123, the protective cover 16 is attached to prevent the optical element 15 from falling off. The protective cover 16 may be made of a light transmitting material such as glass, polymethyl methacrylate (PMMA), polycarbonate (PC), polyimide (PI) or the like. Since the light transmitting material such as glass, PMMA, PC and PI all has excellent light-transmitting property, it is unnecessary to open a light passing hole on the protective cover 16. In this manner, the protective cover 16 can prevent the optical element 15 from being exposed to the outside of the lens barrel 12 while preventing the optical element 15 from falling off, thereby achieving waterproof and dustproof of the optical element 15. In other embodiments, the protective cover 16 may be provided with a light passing hole opposite to an optical effective area of the optical element 15 to avoid blocking the light path of the optical element 15.

Figure 3:
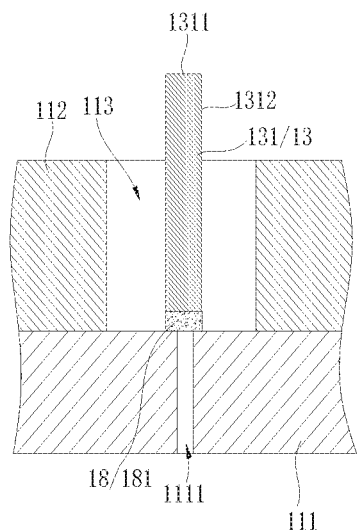

As illustrated in FIGS. 2 and 3, in some embodiments, the light source 13 includes an edge-emitting laser (EEL) 131. In detail, the edge-emitting laser 131 may be a distributed feedback laser (DFB). The edge-emitting laser 131 is columnar as a whole, and an end surface of the edge-emitting laser 131 away from the substrate assembly 11 is formed with a light emitting surface 1311. The laser light is emitted from the light emitting surface 1311, and the light emitting surface 1311 faces to the collimating element 14. When the edge-emitting laser 131 is a light source, in one hand, a temperature drift of the edge-emitting laser 131 is smaller than that of a VCSEL array, and in other hand, since the edge-emitting laser 131 is a single-point illumination structure, it is not necessary to design an array structure, such that the manufacture is simple and the cost of the light source of the projector 10 is low.

Figure 4:
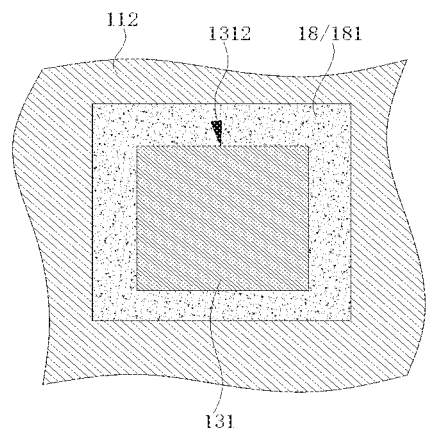

As illustrated in FIGS. 3 and 4, in some embodiments, the projector 10 further includes a fixing member 18, the fixing member 18 is configured to fix the edge-emitting laser 131 to the substrate assembly 11. When the laser light of the distributed feedback laser propagates, a gain of power is obtained through feedback of a grating structure. To increase the power of the distributed feedback laser, it is required to increase an injecting current and/or increase a length of the distributed feedback laser. As the injecting current increases, a power consumption of the distributed feedback laser increases and heat generation is severe. In order to ensure that the distributed feedback laser can work normally, it is required to increase the length of the distributed feedback laser, thus the distributed feedback laser generally is a thin strip. When the light emitting surface 1311 of the edge-emitting laser 131 faces to the collimating element 14, the edge-emitting laser 131 is placed vertically, and since the edge-emitting laser 131 is a thin strip, the edge-emitting laser 131 is prone to accidents such as falling, shifting or shaking. Therefore, the edge-emitting laser 131 can be fixed by the fixing member 18, preventing accidents such as falling, shifting or shaking of the edge-emitting laser 131.

In detail, as illustrated in FIG. 3, in some embodiments, the fixing member 18 includes a sealant 181 disposed between the edge-emitting laser 131 and the substrate assembly 11. In detail, in an example illustrated in FIG. 3, the surface of the edge-emitting laser 131 opposite to the light emitting surface 1311 is attached to the substrate assembly 11. In an example illustrated in FIG. 4, the side surface 1312 of the edge-emitting laser 131 may also be attached to the substrate assembly 11. The sealant 181 encloses the side surfaces 1312, and may be configured to attach only one surface or a plurality of surfaces of the side surfaces 1312 to the substrate assembly 11. Further, the sealant 181 may be a thermal conductive adhesive to conduct heat generated during the operation of the light source 13 to the substrate assembly 11. In order to improve the heat dissipation efficiency, a heat dissipation hole 1111 may be further disposed on the substrate 111. The heat generated during the operation of the light source 13 or the circuit board 112 may be dissipated by the heat dissipation hole 1111, and the heat dissipation hole 1111 may be filled with thermal conductive adhesive to further improve the heat dissipation performance of the substrate assembly 11.

Figure 5:
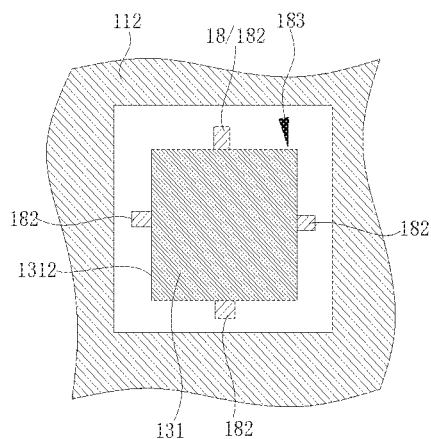

As illustrated in FIG. 5, in some embodiments, the fixing member 18 includes at least two elastic supporting frames 182 disposed on the substrate assembly 11, and the at least two supporting frames 182 collectively form a receiving space 183 for receiving the edge-emitting laser 131. The at least two supporting frames 182 are configured to support the edge-emitting laser 131 to further prevent the edge-emitting laser 131 from shaking.

In some embodiments, the substrate 111 can be omitted and the light source 13 can be directly fixed to the circuit board 112 to reduce an overall thickness of the laser projector 10.

Figure 6:
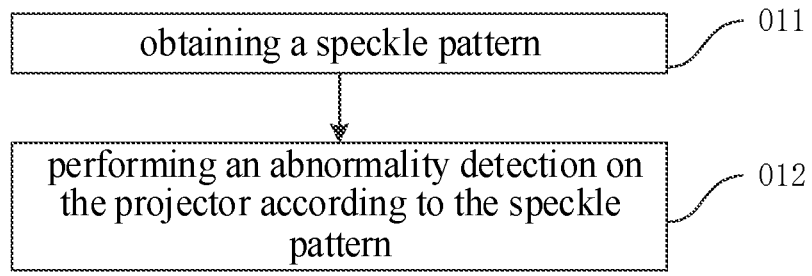
FIGS. 6 to 16 are schematic flow charts of a detection method of a projector according to embodiments of the present disclosure.

As illustrated in FIG. 6, a detection method of a projector according to an embodiment of the present disclosure includes the followings.

At block 011, a speckle pattern is obtained, the speckle pattern is an image generated by irradiating laser light generated by a light source in the projector onto an object through an optical element.

At block 012, an abnormality detection is performed on the projector according to the speckle pattern.

The detection method of the projector according to the embodiment of the present disclosure performs the abnormality detection on the projector according to the speckle pattern, thereby improving a use safety of the projector.

Figure 7:
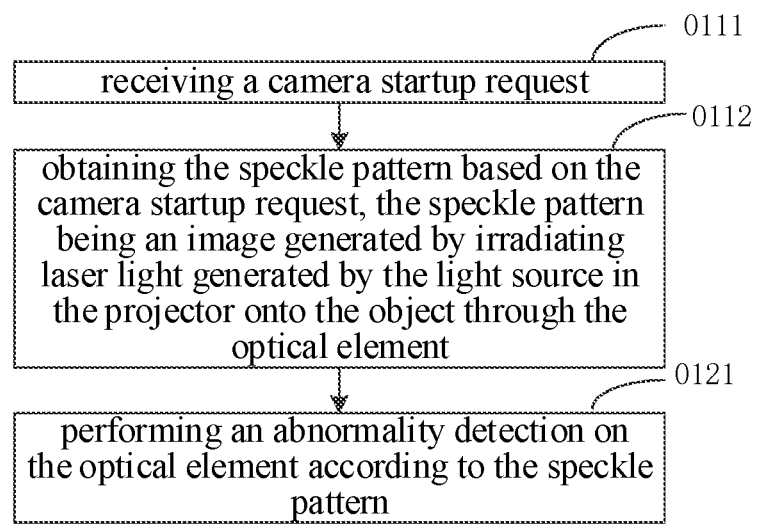

FIG. 7 is a flow chart of the detection method of the projector in one embodiment. As illustrated in FIG. 7, the act at block 011 includes the followings.

At block 0111, a camera startup request is received.

The camera can include a built-in camera and an external camera. In detail, the camera can also be a dual camera. The camera of the electronic device may be an RGB camera for collecting color images, an infrared camera for collecting infrared images, a laser camera for collecting laser speckle images or any combination of the above cameras. The camera startup request may be generated after the user clicks a camera application identifier on a display screen, or may be generated after the user presses a camera control on the electronic device.

The electronic device can receive the generated camera startup request.

At block 0112, the speckle pattern is obtained according to the camera startup request, the speckle pattern is an image generated by irradiating the laser light generated by the light source in the projector onto the object through the optical element.

After receiving the camera startup request, the electronic device may control the projector to project a structured light pattern to the object according to the camera startup request, and collect the speckle pattern through the laser camera after the structured light pattern is reflected by the object. The speckle pattern refers to a speckle image collected by the laser camera and generated by irradiating the laser light generated by the light source in the projector onto the object through the optical element. The projector of the electronic device can be a laser light. The projector includes the light source, the collimating element (such as a collimating mirror) and the optical element. The light source may be a surface emitting laser or a vertical cavity surface laser array. The optical element may be a DOE (Diffractive Optical Element), frosted glass or a combination of both. The electronic device can calculate depth information of the object in an image according to the obtained speckle pattern.

The electronic device emits the laser light generated by the light source in the projector to the object through the optical element, and collects the speckle pattern through the laser camera.

The act at block 012 includes the followings.

At block 0121, the abnormality detection is performed on the optical element according to the speckle pattern.

The abnormality detection on the optical element means that the electronic device analyzes whether the optical element is damaged according to brightness information of the speckle pattern. In detail, the electronic device can also determine a damage degree of the optical element according to different brightnesses of the speckle patterns. The electronic device can set a normal brightness range of the speckle pattern and detect whether a brightness value of the obtained speckle pattern is within the set normal brightness range to perform the abnormality detection on the optical element. The electronic device can also perform the abnormality detection or the like on the optical element by comparing the speckle pattern with a pre-stored speckle pattern.

The electronic device performs the abnormality detection on the optical element according to the speckle pattern by detecting the obtained speckle pattern. The electronic device can collect a RGB image collected through a camera while performing the abnormality detection on the optical element according to the speckle pattern. When the abnormality detection is passed for the optical element, the electronic device can calculate the depth information of the object in the image according to the obtained speckle pattern, and obtain a three-dimensional image of the object according to the RGB image and the depth information calculated from the speckle pattern. The three-dimensional image refers to an image illustrating a distribution pattern and a construction relation of the object on a plane and in space. Compared to a two-dimensional image, the three-dimensional image has height, width as well as depth.

When the optical element is damaged, the laser light emitted onto human eyes may cause serious damage to the eyes, resulting in a low use safety. With the detection method of a projector in the embodiments of the present disclosure, when receiving the camera startup request, the speckle pattern generated by irradiating the laser light generated by the light source in the projector onto the object through the optical element is obtained according to the camera startup request, and the abnormality detection is performed on the optical element according to the speckle pattern. Since the abnormality detection on the optical element can be performed according to the obtained speckle pattern during an activation of the camera, the use safety can be improved.

Figure 8:
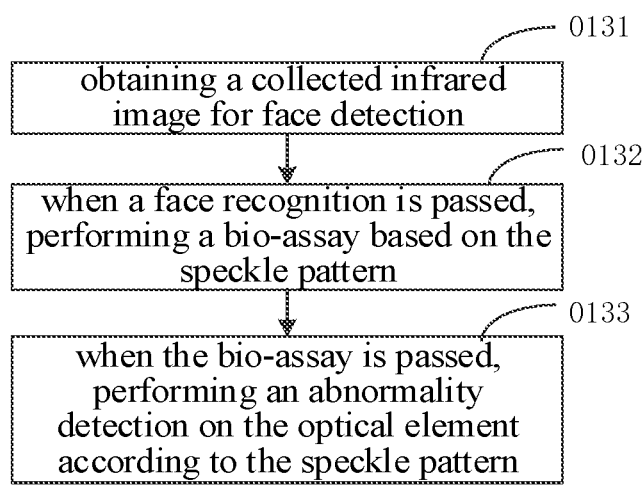

As illustrated in FIG. 8, the detection method of the projector provided in an embodiment may include the followings.

At block 0131, a collected infrared image is obtained for face recognition.

The infrared image is an image formed through controlling the floodlight by the electronic device to emit infrared light onto the object, and collected by the infrared camera. Face recognition refers to a technique of analyzing a given image with a certain algorithm to determine whether the image contains a human face. The infrared image collected by the infrared camera for face recognition can eliminate a large difference in the face recognition with visible light under different light conditions, and solve a problem of incorrect identification when shooting by side light or under a low light condition.

At block 0132, a bio-assay is performed according to the speckle pattern, when the face recognition is passed.

The face recognition is passed when the image collected by the electronic device contains a human face. In detail, there may be one or more human faces existing in the image. When the face recognition is failed, it means that there is no face in the image collected by the electronic device, and it is unnecessary to perform the bio-assay on the image. In the bio-assay, the depth information of the object in the image is obtained according to the speckle pattern and the depth information is analyzed to determine whether the face in the image belongs to a living body. When a living body or other object exists in the speckle pattern, there is a lateral offset between a pixel in the speckle pattern obtained by the electronic device and a corresponding pixel in a reference speckle pattern. By calculating the offset between the pixel in the obtained speckle pattern and the corresponding pixel in the reference speckle pattern, a depth value of a space point corresponding to each pixel in the speckle pattern away from the camera can be obtained. When the depth values of the space points corresponding to respective pixels in the speckle pattern away from the camera are identical or similar, face information in the speckle pattern is two-dimensional face information. When the depth values of the space points corresponding to respective pixels in the speckle pattern away from the camera are different, the face information in the speckle pattern may be determined as face information of a living body.

When the face recognition is passed, the electronic device calculates the depth information of the face according to the obtained speckle pattern and the reference speckle pattern, thereby performing the bio-assay.

At block 0133, the abnormality detection is performed on the optical element according to the speckle pattern, when the bio-assay is passed.

When the bio-assay is passed, the electronic device determines the face in the speckle pattern as a living human face according to the depth information of the face in the speckle pattern.

In the case that the optical element is damaged, the laser light generated by the light source in the projector of the electronic device will cause serious damage to the human eyes when it is irradiated to the living human eyes through the damaged optical element. When the bio-assay is passed, the abnormality detection is performed on the optical element according to the speckle pattern for which the bio-assay is passed. When it is detected that the optical element is abnormal, the projector can be turned off in time to avoid harm to the user and improve the use safety.

Figure 9:
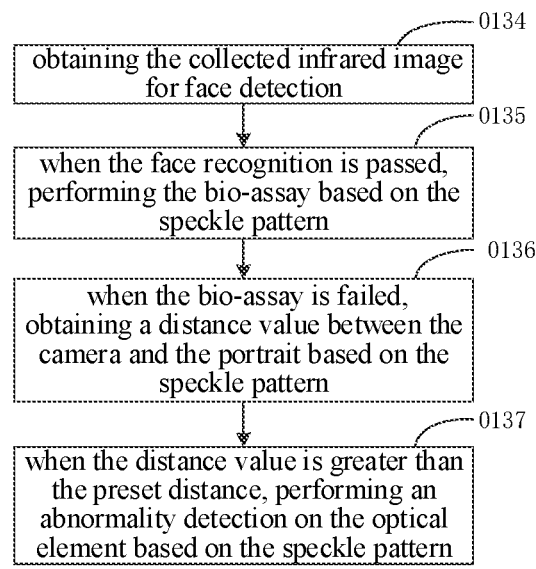

As illustrated in FIG. 9, the detection method of the projector provided in an embodiment may further include the followings.

At block 0134, the collected infrared image is obtained for face recognition.

At block 0135, the bio-assay is performed according to the speckle pattern, when the face recognition is passed.

At block 0136, a distance value between the camera and a portrait is obtained according to the speckle pattern, when the bio-assay is failed.

The failure of the bio-assay means that the face information in the speckle pattern for which the face recognition is passed and that is collected by the electronic device is two-dimensional face information. The distance value between the camera and the portrait is a distance between a position where the laser camera is located and a position of the portrait. The distance value between the camera and the portrait corresponds to a distance value between the electronic device and the portrait. When the bio-assay is failed, the electronic device can obtain the depth value of the space point corresponding to each pixel of the speckle pattern away from the camera according to the offset between the pixel in the speckle pattern and the corresponding pixel in the reference speckle pattern, thereby obtaining the depth value of the space point corresponding to each pixel of the face in the speckle pattern away from the camera and further obtaining the distance value between the camera and the portrait.

At block 0137, the abnormality detection is performed on the optical element according to the speckle pattern, when the distance value is greater than a preset distance.

The preset distance can be set according to characteristics of different laser light and practical working requirements. In detail, the preset distance may be 20 cm, 30 cm, which is not limited thereto. When the distance value between the camera and the portrait is greater than the preset distance, the electronic device performs the abnormality detection on the optical element according to the speckle pattern. In one embodiment, when the distance value is less than the preset distance, the electronic device can adjust an operating current, an operating frequency or the like of the projector. In detail, the electronic device can reduce the operating current of the projector to, but is not limited to, 20%, 25% of an initial current, and set the operating frequency of the projector to, but is not limited to, 1 fps (Frames Per Second) or 2 fps.

Figure 10:
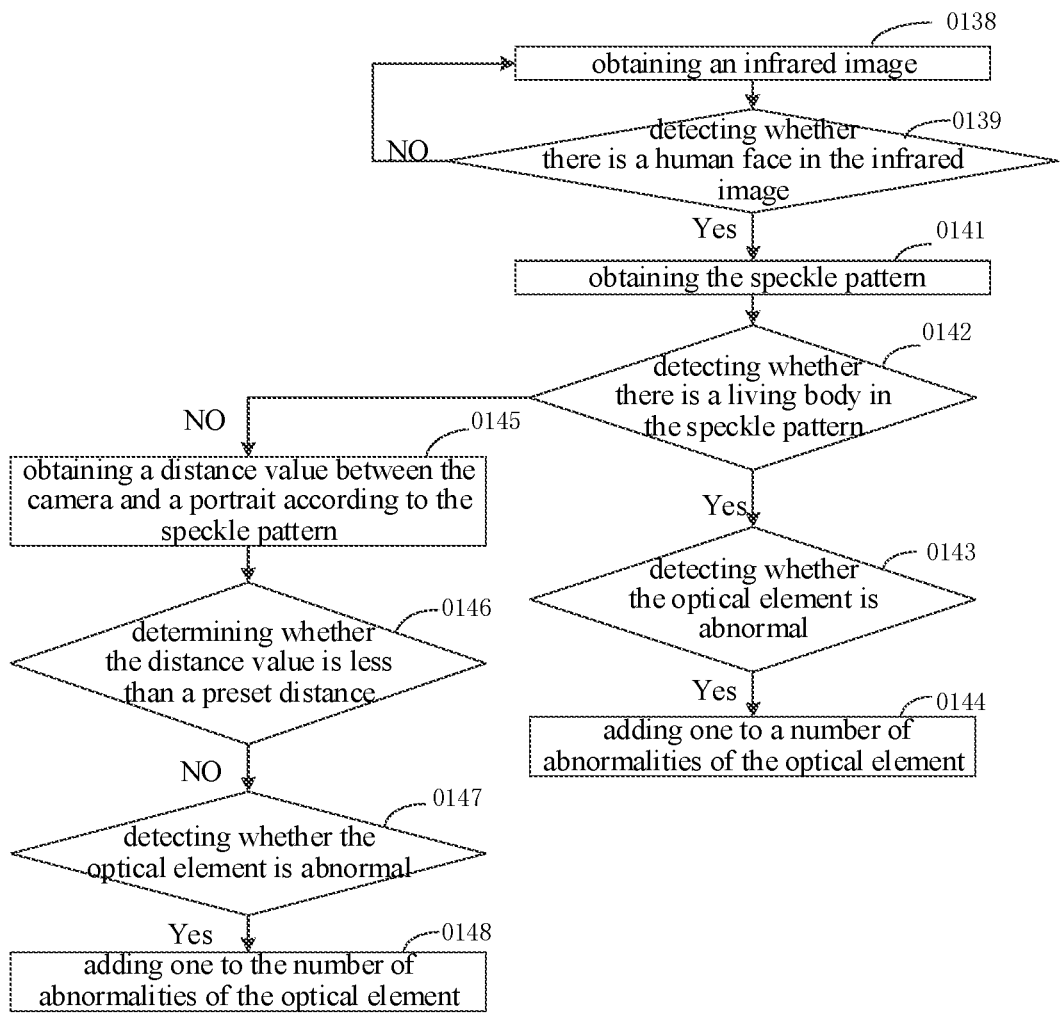

FIG. 10 is a flow chart of the detection method of the projector according to an embodiment of the present disclosure. The detection method includes the followings.

At block 0138, an infrared image is obtained. The infrared image is an image formed through controlling the floodlight by the electronic device to emit infrared light onto the object, and collected by the infrared camera.

At block 0139, whether there is a human face in the infrared image is detected; if yes, the act at block 0141 is executed.

At block 0141, the speckle pattern is obtained.

At block 0142, whether there is a living body in the speckle pattern is detected; if no, the act at block 0145 is executed, and if yes, the act at block 0143 is executed.

At block 0143, whether the optical element is abnormal is detected; if yes, the act at block 0144 is executed.

At block 0144, a number of abnormalities of the optical element is added by one.

At block 0145, a distance value between the camera and a portrait is obtained according to the speckle pattern.

At block 0146, it is determined whether the distance value is less than a preset distance.

At block 0147, whether the optical element is abnormal is detected; if yes, the act at block 0148 is executed.

At block 0148, the number of abnormalities of the optical element is added by one.

By adjusting the operating current and the operating frequency of the projector when the distance value is less than the preset distance, an intensity of the laser light and an irradiation time of the laser light can be reduced, thereby reducing damage to the human eyes. When the distance value is greater than the preset distance, the abnormality detection on the optical element is performed according to the speckle pattern, such that whether the optical element is abnormal can be detected during the use of the projector, thus improving the use safety.

In one embodiment, the detection method of the projector performing the abnormality detection on the optical element according to the speckle pattern includes determining that the optical element is abnormal when the number of continuously detected abnormalities of the speckle pattern is greater than a first preset value.

In detail, the electronic device performs the abnormality detection on the optical element according to the speckle pattern, and performs the abnormality detection on the speckle pattern according to the brightness information of the speckle pattern. When detecting that the speckle pattern is normal, the electronic device stops performing the abnormality detection on the optical element. When detecting that the speckle pattern is abnormal, the electronic device records the number of abnormalities of the speckle pattern, adds one to the number of abnormalities of the speckle pattern, continuously collects the speckle pattern, and performs the abnormality detection on the speckle pattern. The electronic device determines that the optical element is abnormal when the number of continuously detected abnormalities of the speckle pattern is greater than the first preset value. The first preset value may be set according to requirements in a practical application, for example, the first preset value may be set to, but is not limited to, 3 or 4.

By determining that the optical element is abnormal when the number of continuously detected abnormalities of the speckle pattern is greater than the first preset value, it is possible to avoid obtaining a wrong result of the abnormality detection of the optical element due to the abnormality of the speckle pattern caused by environmental factors such as having an object with a high reflectance in the image or a large intensity of outdoor natural light, thereby improving the detection accuracy of the optical element.

In one embodiment, detecting the abnormality of the speckle pattern in the detection method of the projector includes obtaining a brightness value of a zero-order region in the speckle pattern; and determining that the speckle pattern is abnormal when the brightness value of the zero-order region is greater than a preset threshold.

The zero-order region is a region with a maximum brightness value in the speckle pattern. In detail, due to a shooting distance, the zero-order region in the speckle pattern may be located at the center or the center-right position of the speckle pattern. The electronic device can traverse the speckle pattern by setting a search box of a preset size, and take a region where the search box having a maximum brightness value is located as the zero-order region. After the electronic device determines the zero-order region, the brightness value of the zero-order region in the speckle pattern can be obtained, and when the brightness value of the zero-order region in the speckle pattern is greater than the preset threshold, it is determined that the speckle pattern is abnormal. The preset threshold can be set according to experimental data or practical usage requirements. In detail, the preset threshold should be greater than a maximum brightness of any pixel in an image generated by irradiating the laser light generated by the light source in the projector through the optical element to the object under natural light.

In the case that the optical element is abnormal, due to optical characteristics of the laser light, a brightness of a central region of the speckle pattern may be abnormal. The electronic device can determine whether the optical element is abnormal by detecting the brightness value of the region where the brightness value of the speckle pattern is abnormal and the preset threshold.

Figure 11:
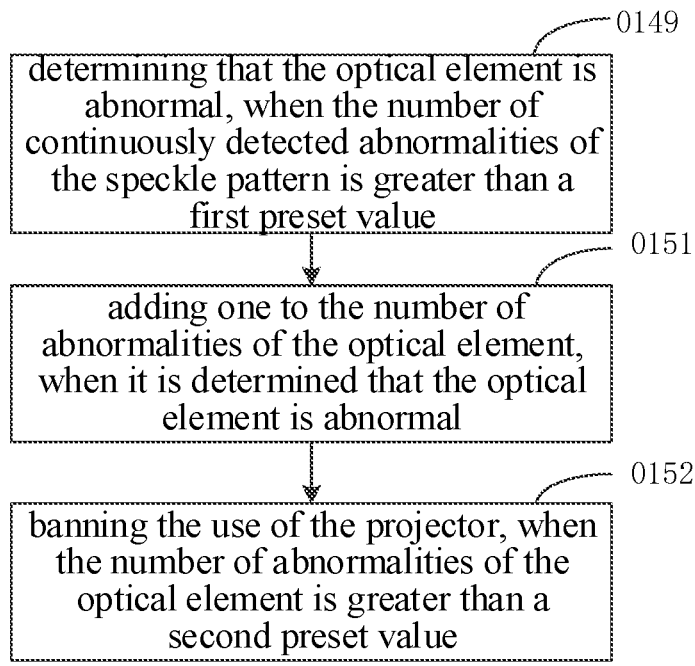

In one embodiment, the detection method of the projector may further include a process of detecting the number of abnormalities of the optical element, as illustrated in FIG. 11, the process includes the followings.

At block 0149, it is determined that the optical element is abnormal, when the number of continuously detected abnormalities of the speckle pattern is greater than a first preset value.

When detecting that the speckle pattern is normal, the electronic device stops performing the abnormality detection on the optical element. When detecting that the speckle pattern is abnormal, the electronic device records the number of abnormalities of the speckle pattern, adds one to the number of abnormalities of the speckle pattern, continuously collects the speckle pattern, and performs the abnormality detection on the speckle pattern. The electronic device determines that the optical element is abnormal when the number of continuously detected abnormalities of the speckle pattern is greater than the first preset value.

At block 0151, the number of abnormalities of the optical element is added by one, when it is determined that the optical element is abnormal.

The number of abnormalities of the optical element is the times of occurrences of the electronic device determining that the optical element is abnormal when the electronic device performs the abnormality detection on the optical element according to the speckle pattern. The electronic device can perform the abnormality detection on the optical element when receiving the camera startup request, can also perform the abnormality detection on the optical element when the bio-assay is passed in the face recognition, and can also perform the abnormality detection on the optical element when the bio-assay is failed and the distance value between the camera and the portrait is greater than the preset distance. The electronic device can record abnormal detection results of the optical element under different conditions.

When it is determined that the optical element is abnormal, the electronic device can record the number of abnormalities of the optical element and add one to the number of abnormalities of the optical element.

At block 0152, the use of the projector is banned when the number of abnormalities of the optical element is greater than a second preset value.

The projector includes the light source, the collimating element and the optical element. The laser light is irradiated onto the object through the optical element to generate the speckle pattern. When the optical element is damaged, the intensity of the laser light that is irradiated onto the object increases, causing serious damage to the human eyes when it is irradiated to the human eyes. When the number of abnormalities of the optical element is greater than the second preset value, the electronic device bans the use of the projector, such that the damage to the human eye caused by the abnormality of the optical element can be reduced. When the number of abnormalities of the optical element is less than the second preset value, the electronic device may issue a reminder indicating that the optical element is damaged to the user so as to reduce the use of the camera or the face recognition function by the user, record the number of abnormalities of the optical element, and upload the abnormal result of the optical element to a server. The second preset value can be determined according to requirements in a practical use process. In detail, in order to improve the use safety, the second preset value may be a small value, for example, 3 or 5, but it is not limited thereto.

When the number of continuously detected abnormalities of the speckle pattern is greater than the first preset value, the electronic device determines that the optical element is abnormal, and adds one to the number of abnormalities of the speckle pattern. The electronic device bans the use of the projector when the number of abnormalities of optical elements is greater than the second preset value. Since the use of the projector can be banned when it is determined that the optical element is abnormal for many times and the number of abnormalities is greater than the preset value, the use safety of the projector can be improved while taking the detection accuracy into consideration.

Figure 12:
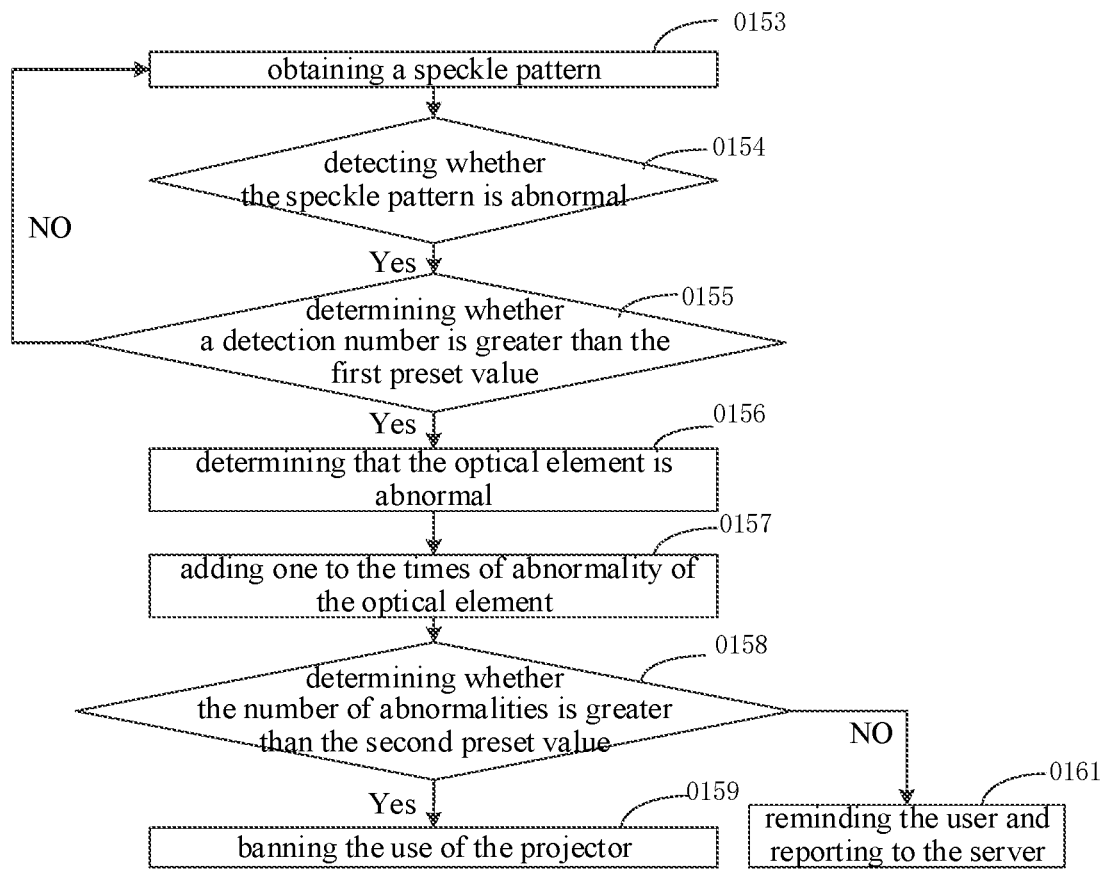

FIG. 12 is a flow chart of a process of performing the abnormality detection on the optical element in the detection method of the projector according to another embodiment of the present disclosure. The detection method includes the followings.

At block 0153, the speckle pattern is obtained.

At block 0154, whether the speckle pattern is abnormal is detected, if yes, the act at block 0155 is executed.

At block 0155, it is determined whether a detection number is greater than the first preset value; if no, the act at block 0153 is executed again, and if yes, the act at block 0156 is executed.

At block 0156, it is determined that the optical element is abnormal.

At block 0157, the number of abnormalities of the optical element is added by one.

At block 0158, it is determined whether the number of abnormalities is greater than the second preset value; if yes, the act at block 0159 is executed to ban the use of the projector, and if no, the act at block 0161 is executed.

At block 0161, the user is reminded and the situation is reported to the server.

In another embodiment, the detection method of the projector includes the followings.

When the face recognition is passed, the bio-assay is performed according to the obtained speckle pattern. The speckle pattern is an image generated by irradiating the laser light generated by the light source in the projector onto the object through the optical element. When the bio-assay is passed, the abnormality detection is performed on the optical element according to the speckle pattern.

Face recognition refers to a technique in which the electronic device analyzes an image using a certain algorithm according to the obtained RGB image or infrared image to determine whether the image contains a human face. Face recognition is passed when the image collected by the electronic device contains a human face. In detail, there may be one or more faces in the image when the face recognition is passed. Bio-assay refers to a technique in which the depth information of the object in the speckle pattern is obtained according to the speckle pattern and the depth information is analyzed to determine whether the face in the speckle pattern belongs to a living body. When the bio-assay is passed, i.e., a living human face presents in the speckle pattern, the electronic device can perform the abnormality detection on the optical element according to the obtained speckle pattern.

When a living human face presents in the speckle pattern, if the optical element is damaged, the laser light generated by the light source in the projector of the electronic device may cause serious damage to the human eyes when it is irradiated to the human eyes of the living body through the damaged optical element. In the face recognition, the abnormality detection can be performed on the optical element according to the speckle pattern for which the bio-assay is passed. When it is detected that the optical element is abnormal, the user can be promptly reminded to reduce the use of the camera or stop using the projector, thereby reducing damage to the user and improving the use safety.

In one embodiment, the detection method of the projector can be implemented as follows. The electronic device can receive the camera startup request. The camera can include a built-in camera and an external camera. In detail, the camera can also be a dual camera. The camera of the electronic device may be an RGB camera for collecting color images, an infrared camera for collecting infrared images, a laser camera for collecting laser speckle images or any combination of the above cameras. The camera startup request may be generated after the user clicks the camera application identifier on the display screen, or may be generated after the user presses the camera control on the electronic device. The electronic device can receive the generated camera startup request.

The electronic device obtains the speckle pattern according to the camera startup request, and the speckle pattern is an image generated by irradiating the laser light generated by the light source in the projector onto the object through the optical element. After receiving the camera startup request, the electronic device may control the projector to project the structured light pattern to the object according to the camera startup request, and collect the speckle pattern through the laser camera after the structured light pattern is reflected by the object. The speckle pattern refers to a speckle image collected by the laser camera and generated by irradiating the laser light generated by the light source in the projector onto the object through the optical element. The projector includes the light source, the collimating element and the optical element. The light source may be a surface emitting laser or a vertical cavity surface laser array. The optical element may be a DOE, frosted glass or a combination of both.

In at least one embodiment, the electronic device may further obtain the collected infrared image for face recognition, and when the face recognition is passed, the electronic device may obtain the collected speckle pattern. The infrared image is an image formed through controlling the floodlight by the electronic device to emit infrared light onto the object, and collected by the infrared camera. Face recognition refers to a technique of analyzing a given image with a certain algorithm to determine whether the image contains a human face. The face reorganization is passed when the image collected by the electronic device contains a human face. In detail, there may be one or more faces in the image. The electronic device can obtain the speckle pattern collected by the laser camera when the face recognition is passed, and the electronic device can perform the bio-assay on the face in the speckle pattern according to the obtained speckle pattern.

The electronic device performs the abnormality detection on the optical element according to the speckle pattern. The abnormality detection on the optical element means that the electronic device determines whether the optical element is damaged by analyzing the brightness information of the speckle pattern. In detail, the electronic device can also determine the damage degree of the optical element according to the difference in brightnesses of the speckle patterns. The electronic device can perform the abnormality detection on the optical element by setting a normal brightness range of the speckle pattern and detecting whether the brightness value of the obtained speckle pattern is within the normal brightness range. The electronic device can also perform the abnormality detection or the like on the optical element by comparing the speckle pattern with the pre-stored speckle pattern.

In at least one embodiment, the electronic device may perform the bio-assay according to the obtained speckle pattern, and when the bio-assay is passed, the electronic device performs the abnormality detection on the optical element according to the speckle pattern. Bio-assay refers to a technique in which the depth information of the object in the speckle pattern is obtained according to the speckle pattern and the depth information is analyzed to determine whether the face in the speckle pattern belongs to a living body. When a living body or other object exists in the speckle pattern, there is a lateral offset between a pixel in the speckle pattern obtained by the electronic device and a respective pixel in the reference speckle pattern. By calculating the offset between the pixel in the obtained speckle pattern and the respective pixel in the reference speckle pattern, the depth value of the space point corresponding to each pixel in the speckle pattern away from the camera can be obtained. When the face in the speckle pattern belongs to a living body, the depth values of the space points corresponding to respective pixels in the speckle pattern away from the camera obtained by the electronic device are different. For example, the depth value of the space point corresponding to the nose of the face in the speckle pattern away from the camera is larger than the depth value of the space point corresponding to the glasses of the face in the speckle pattern away from the camera, so that the face in the speckle pattern can be determined as belonging to a living body. When the bio-assay is passed, i.e., the face in the speckle pattern belongs to a living body, the electronic device can perform the abnormality detection on the optical element according to the obtained speckle pattern.

In at least one embodiment, the electronic device may further obtain the distance value between the camera and the portrait according to the speckle pattern when the bio-assay is failed, and perform the abnormality detection on the optical element according to the speckle pattern when the distance value is greater than the preset distance. The preset distance can be set according to the characteristics of different laser light and actual working requirements. In detail, the preset distance may be 20 cm, 30 cm, and is not limited thereto. For example, when the face in the speckle pattern is actually a face in a picture, the depth values of the spatial points corresponding to respective pixels of the face obtained by the electronic device away from the camera are identical, i.e., the laser camera shoots the two-dimensional face information, the bio-assay is failed. When the depth value is less than the preset distance such as 25 cm, the electronic device can perform the abnormality detection on the optical element according to the speckle pattern. The electronic device can also adjust the operating current, operating frequency, and the like of the projector when the distance value is less than the preset distance. In detail, the electronic device can reduce the operating current of the projector to, but is not limited to, 20%, 25% of the initial current, and set the operating frequency of the projector to, but is not limited to, 1 fps (Frames Per Second) or 2 fps. When the distance value is less than the preset distance, the electronic device adjusts the operating current and the operating frequency of the projector to reduce the intensity of the laser light and the irradiation time of the laser light, thereby reducing damage to the human eyes.

In at least one embodiment, the electronic device obtains the brightness value of the zero-order region in the speckle pattern, and determines that the speckle pattern is abnormal when the brightness value of the zero-order region in the speckle pattern is greater than the preset threshold. The zero-order region is the region with the maximum brightness value in the speckle pattern. In detail, due to the shooting distance, the zero-order region may be located at the center of the speckle pattern or at the center-right position of the speckle pattern. The electronic device can traverse the speckle pattern by setting a search box of a preset size, and take the region where the search box having the maximum brightness value is located as the zero-order region. After the electronic device determines the zero-order region, the brightness value of the zero-order region in the speckle pattern can be obtained, and when the brightness value of the zero-order region in the speckle pattern is greater than the preset threshold, it is determined that the speckle pattern is abnormal. The preset threshold can be set according to experimental data or practical usage requirements.

In at least one embodiment, when the number of abnormalities of the speckle pattern continuously detected by the electronic device is greater than the first preset value, it is determined that the optical element is abnormal. When the electronic device performs the abnormality detection on the optical element according to the speckle pattern, and the electronic device can perform the abnormality detection on the speckle pattern according to the brightness information of the speckle pattern. When detecting that the speckle pattern is normal, the electronic device stops performing the abnormality detection on the optical element. When detecting that the speckle pattern is abnormal, the electronic device records the number of abnormalities of the speckle pattern, adds one to the number of abnormalities of the speckle pattern, continuously collects the speckle pattern, and performs the abnormality detection on the speckle pattern. The electronic device determines that the optical element is abnormal when the number of continuously detected abnormalities of the speckle pattern is greater than the first preset value.

In at least one embodiment, when the optical element is determined to be abnormal, the electronic device adds one to the number of abnormalities of the optical element. When the number of abnormalities of the optical element is greater than the second preset value, the electronic device bans the use of the projector. The number of abnormalities of the optical element is the times of occurrences of the electronic device determining that the optical element is abnormal when performing the abnormality detection on the optical element according to the speckle pattern. When the optical element is determined to be abnormal, the electronic device can record the number of abnormalities of the optical element and add one to the number of abnormalities of the optical element. When the number of abnormalities of the optical element is greater than the second preset value, the electronic device bans the use of the projector, such that the damage to the human eyes caused by the abnormality of the optical element can be reduced. When the number of abnormalities of the optical element is less than the second preset value, the electronic device may issue a reminder indicating that the optical element is damaged to the user so as to reduce the use of the camera or the face recognition function by the user, record the number of abnormalities of the optical element, and upload the abnormal result of the optical element to the server.

Figure 13:
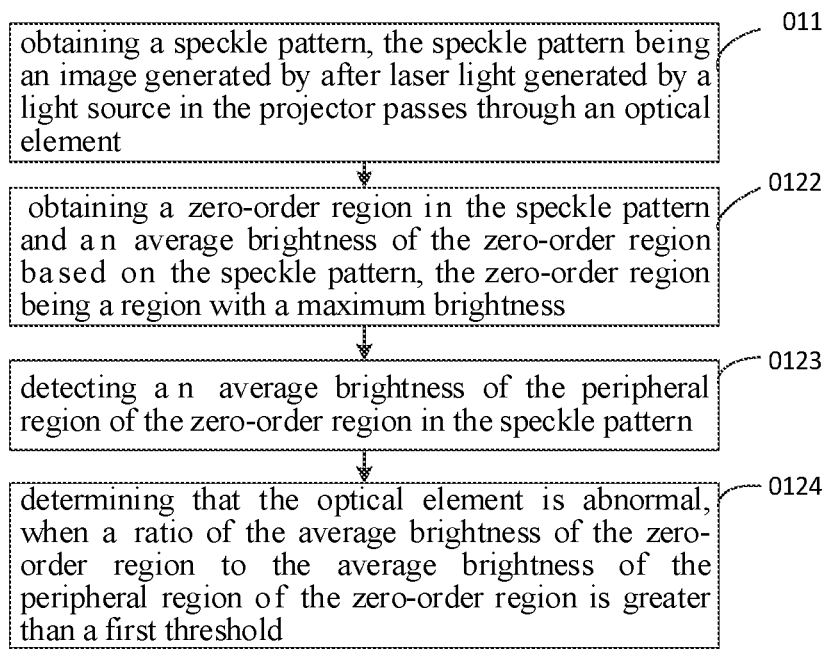

FIG. 13 is a flow chart of a detection method of a projector in an embodiment. As illustrated in FIG. 13, the detection method of the projector includes the acts at block 011 and 012.

At block 011, a speckle pattern is obtained, the speckle pattern is an image generated after laser light generated by a light source in the projector passes through an optical element.

The speckle pattern refers to a speckle image collected by a laser camera and generated by irradiating the laser light generated by the light source in the projector onto an object through the optical element. The projector of the electronic device can be a laser light. The projector includes the light source, the collimating element, and the optical element. The light source may be a surface emitting laser or a vertical cavity surface laser array. The optical element can be a DOE, frosted glass, or a combination of both. The laser camera includes an image sensor, a lens, or the like, and the image sensor may be CMOS, CCD, or the like.

The electronic device obtains the structured light pattern projected by the projector to the object, and collects the speckle pattern through the laser camera after the structured light pattern is reflected by the object.

The act at block 012 includes the followings.

At block 0122, a zero-order region in the speckle pattern and an average brightness of the zero-order region are obtained according to the speckle pattern, the zero-order region is a region with a maximum brightness.

The zero-order region is the region with the maximum brightness value in the speckle pattern. In the case that the optical element is abnormal, a brightness of a central region of the speckle pattern is abnormal due to optical characteristics of the laser light. In detail, due to a shooting distance, the zero-order region may be located at the center of the speckle pattern or at the center-right position of the speckle pattern. The electronic device can traverse the speckle pattern by setting a search box of a preset size, take a region where the search box having a maximum brightness value is located as the zero-order region, and obtain the average brightness of the zero-order region. The average brightness of the zero-order region refers to an average of the brightnesses of pixels in the zero-order region.

The electronic device searches for the region with the maximum brightness value in the speckle pattern as the zero-order region, and obtains the average brightness of the zero-order region.

At block 0123, an average brightness of the peripheral region of the zero-order region in the speckle pattern is detected.

The peripheral region of the zero-order region in the speckle pattern refers to a region other than the zero-order region in the speckle pattern. In detail, the electronic device can detect the average brightnesses of all peripheral regions of the zero-order region in the speckle pattern, and can also obtain the average brightnesses of a part of peripheral regions of the zero-order region by extracting the part of peripheral regions of the zero-order region. The number of the peripheral regions of the zero-order region extracted by the electronic device can be determined according to actual application requirements and a detection effect. In detail, the electronic device may extract 4, 8 or 12 peripheral regions of the zero-order region, but is not limited thereto.

The electronic device detects a brightness value of each pixel point in the peripheral region of the zero-order region by obtaining the peripheral region of the zero-order region in the speckle pattern, and calculates an average of the brightness values of the pixel points as the average brightness of the peripheral region of the zero-order region.

At block 0124, it is determined that the optical element is abnormal, when a ratio of the average brightness of the zero-order region to the average brightness of the peripheral region of the zero-order region is greater than a first threshold.

The first threshold can be determined based on experimental data and practical application effects. The first threshold may be a ratio of the average brightness of the zero-order region to that of the peripheral region when the laser light generated by the light source in the projector is irradiated onto the object through the optical element having a perforation or a scratch. In the case that the electronic device obtains the average brightnesses of all the peripheral regions of the zero-order region, when the ratio of the average brightness of the zero-order region to the average brightness of each peripheral region is greater than the first threshold, it is determined that the optical element is abnormal. In the case that the electronic device extracts the average brightnesses of a plurality of peripheral regions of the zero-order region, when the ratio of the average brightness of the zero-order region to the average brightness of each of the plurality of peripheral regions is greater than the first threshold, it is determined that the optical element is abnormal. In this case, the optical element may have perforations or scratches, the electronic device can alert the user and upload the detection result to the server. When the ratio of the average brightness of the zero-order region to the average brightness of each peripheral region is smaller than the first threshold or the ratio of the average brightness of the zero-order region to the average brightness of at least one of the plurality of peripheral regions is less than the first threshold, it is determined that the optical element is normal.

When the optical element is damaged, the laser light may cause serious damage to the human eyes when it is irradiated to the human eyes, and the use safety is low. The detection method of the projector in the embodiment of the present disclosure obtains the speckle pattern generated after the laser light generated by the light source in the projector passes through the optical element, and obtains the region with the maximum brightness in the speckle pattern, i.e., the zero-order region, and the average brightness of the zero-order region, according to the speckle pattern, detects the average brightness of the peripheral region of the zero-order region in the speckle pattern, and determines that the optical element is abnormal when the ratio of the average brightness of the zero-order region to the average brightness of the peripheral region of the zero-order region is greater than the first threshold. Since the optical element can be detected according to the ratio of the brightness of the zero-order region in the speckle pattern to the brightness of the peripheral region of the zero-order region, an influence of a brightness change of the speckle pattern caused by different illumination intensities, exposure time or the like on the detection result of optical element is prevented, such that the detection accuracy can be improved.

Figure 14:
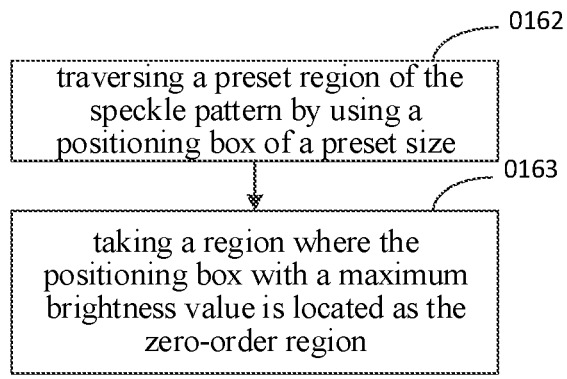

As illustrated in FIG. 14, a process for obtaining the zero-order region in the detection method of the projector according to an embodiment may include the followings At block 0162, a positioning box of a preset size is used to traverse a preset region of the speckle pattern.

The preset region of the speckle pattern refers to a preset maximum range of a region where the zero-order region is located. The positioning box of the preset size refers to a search box set according to a size of the zero-order region. In detail, a size of the preset region of the speckle pattern and the preset size of the positioning box may be determined according to experimental data or requirements in practical applications. The positioning box may be used to traverse the preset region of the speckle pattern with a horizontal traversal strategy or a vertical traversal strategy. The electronic device may further determine a location of the zero-order region in advance according to a brightness value of a position of the positioning box during the traversal process, and determine the numbers of traversal times of different regions in the preset region according to the determination result. For example, in a speckle pattern of 1000*1000 pixels, the preset region may be a region having 600*600 pixels and a center point coinciding with a center point of the speckle pattern. The positioning box of the preset size may be a positioning box of 30*30 pixels. The electronic device can traverse the preset region using the positioning box of 30*30 pixels. Under normal conditions, the number of traversal times is 100 when using the horizontal traversal strategy. In a horizontal traversal process, if a brightness value on the right side of the positioning box is greater than a brightness value on the left side of the positioning box, the electronic device can determine that the zero-order region is located in the right of the speckle pattern, and the electronic device can adjust the number of traversal times according to the determination result so as to reduce the number of traversal times in the left area.

At block 0163, a region where the positioning box with a maximum brightness value is located is taken as the zero-order region.

The electronic device adopts the positioning box of the preset size to traverse the preset region of the speckle pattern, obtains a brightness value of the region where the positioning box is located during the traversal process, and takes the region where the positioning box with the maximum brightness value is located as the zero-order region.

By using the positioning box of the preset size to traverse the preset region of the speckle pattern and taking the region where the positioning box with the maximum brightness value is located as the zero-order region, an efficiency of acquiring the zero-order region can be improved.

Figure 15:
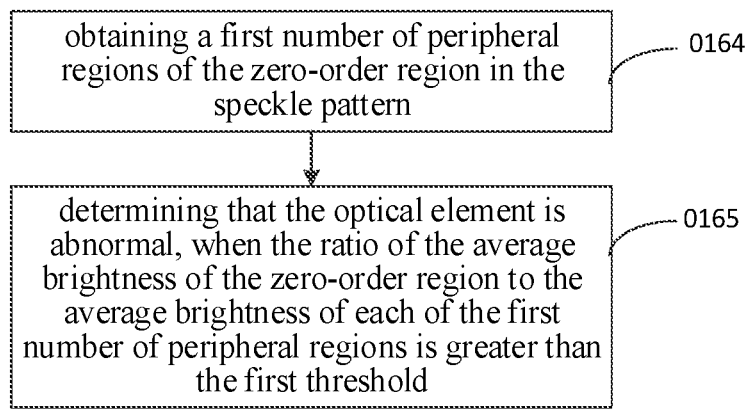

As illustrated in FIG. 15, in an embodiment, the detection method of the projector may further include the followings.

At block 0164, a first number of peripheral regions of the zero-order region in the speckle pattern are obtained.

In detail, the first number of peripheral regions of the zero-order region may have the same size as the zero-order region, or may have different sizes from the zero-order region, for example, twice the size of the zero-order region, or a size smaller than that of the zero-order region. The first number of the peripheral regions of the zero-order region obtained by the electronic device may be 4, 8, 10, or the like, but is not limited thereto.

At block 0165, it is determined that the optical element is abnormal when the ratio of the average brightness of the zero-order region to the average brightness of each of the first number of peripheral regions is greater than the first threshold.

The electronic device determines that the optical element is abnormal when the ratio of the average brightness of the zero-order region to the average brightness of the peripheral region of the zero-order region is greater than the first threshold. In the case that the electronic device acquires a plurality of peripheral regions of the zero-order region, when the ratio of the average brightness of the zero-order region to the average brightness of each of the plurality of peripheral regions is greater than the first threshold, it is determined that the optical element is abnormal. When the ratio of the average brightness of the zero-order region to the average brightness of at least one of the plurality of peripheral regions is less than the first threshold, it is determined that the optical element is normal. For example, assuming that the average brightnesses of four peripheral regions of the zero-order region obtained by the electronic device are respectively 80, 88, 93 and 100, and that the first threshold is 2, if the average brightness of the zero-order region is 220, the ratios of the average brightness of the zero-order region to the average brightnesses of the four peripheral regions are respectively 2.75, 2.50, 2.44 and 2.2, which are greater than the first threshold, then the optical element is determined to be abnormal; if the average brightness of the zero-order region is 180, the ratios of the average brightness of the zero-order region to the average brightnesses of the four peripheral regions are respectively 2.25, 2.05, 1.94 and 1.8, since there is at least one ratio less than 2, it is determined that the optical element is normal.

By extracting the first number of peripheral regions of the zero-order region and determining that the optical element is abnormal when the ratio of the average brightness of the zero-order region to the average brightness of each of the first number of peripheral regions is greater than the first threshold, a detection error caused by excessive brightnesses of some peripheral regions due to exposure time, object reflection or the like can be avoided and the detection accuracy can be improved.

Figure 16:
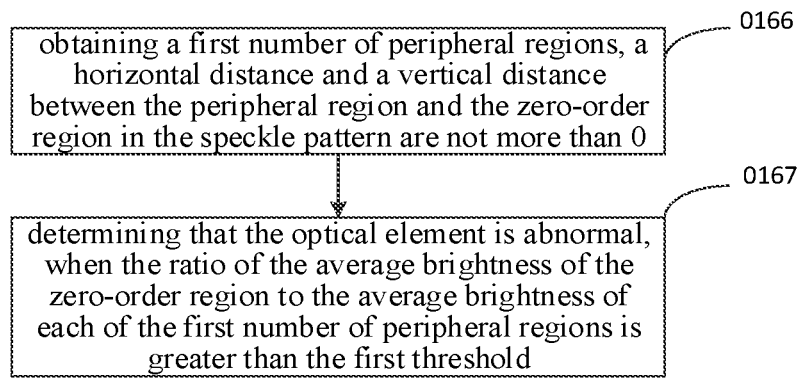

As illustrated in FIG. 16, a process of obtaining the first number of peripheral regions of the zero-order region in the detection method of the projector according to an embodiment further includes the followings.

At block 0166, the first number of peripheral regions are obtained. A horizontal distance between the peripheral region and the zero-order region and a vertical distance between the peripheral region and the zero-order region are both no more than 0.

The horizontal distance between the peripheral region and the zero-order region no more than 0 means that in the horizontal direction, an edge of the obtained peripheral region coincides with the zero-order region or an edge of the zero-order region. Similarly, the vertical distance between the peripheral region and the zero-order region no more than 0 means that in the vertical direction, an edge of the obtained peripheral region coincides with the zero-order region or an edge of the zero-order region. The positions where the first number of obtained peripheral regions each having the horizontal distance and the vertical distance to the zero-order region no more than 0 are located may not coincide with the position where the zero-order region is located. The first number of peripheral regions acquired by the electronic device may be two regions, four regions, eight regions, and the like, and is not limited thereto. The first number of peripheral regions acquired by the electronic device may have the same size as the zero-order region, or may have a size larger or smaller than the size of the zero-order region.

At block 0167, it is determined that the optical element is abnormal when the ratio of the average brightness of the zero-order region to the average brightness of each of the first number of peripheral regions is greater than the first threshold.

When the ratio of the average brightness of the zero-order region to the average brightness of each of the first number of peripheral regions is greater than the first threshold, it is determined that the optical element is abnormal. When the ratio of the average brightness of the zero-order region to the average brightness of at least one of the first number of peripheral regions is less than the first threshold, it is determined that the optical element is normal.

Figure 17:
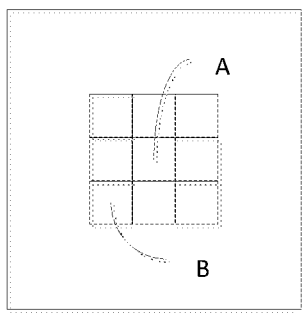
FIG. 17 is a schematic diagram of a peripheral region of a zero-order region of a speckle pattern according to an embodiment of the present disclosure.

FIG. 17 is a schematic diagram of a peripheral region of the zero-order region in a speckle pattern acquired by the electronic device according to an embodiment of the present disclosure. The zero-order region A is the region with the maximum average brightness in the speckle pattern, and eight peripheral regions B are eight regions each having the horizontal distance and the vertical distance to the zero-order region no more than 0 and the same size as the zero-order region. The electronic device can detect the average brightness of each of the eight peripheral regions B. When the ratio of the average brightness of the zero-order region A to the average brightness of each of the eight peripheral regions B is greater than the first threshold, it is determined that the optical element is abnormal. In other embodiments, the electronic device can perform a detection on the optical element by using four regions or six regions, and can also perform the detection on the optical element by changing the size of the peripheral region.

In one embodiment, the detection method of the projector further includes: determining that the optical element is severely abnormal when the ratio of the average brightness of the zero-order region to the average brightness of the peripheral region of the zero-order region is greater than a second threshold. The second threshold is greater than the first threshold.

The second threshold can be determined based on experimental data and practical application effects. In detail, the second threshold may be a ratio of the average brightness of the zero-order region to the average brightness of the peripheral region when the laser light generated by the light source in the projector is directly irradiated onto the object. The second threshold may also be a ratio of the average brightness of the zero-order region to the average brightness of the peripheral region when the laser light generated by the light source in the projector is irradiated onto the object through the optical element having a large perforation. When the ratio of the average brightness of the zero-order region to the average brightness of each of the peripheral regions is greater than the second threshold, it is determined that the optical element is severely abnormal, and in this case, the optical element may be seriously damaged or completely detached. The electronic device may ban the use of the projector, when it is determined that the optical element is severely abnormal.

In one embodiment, the detection method of the projector, after determining that the optical element is abnormal, further includes: adding one to the number of abnormalities of the optical element when it is determined that the optical element is abnormal.

The number of abnormalities of the optical element is the times of occurrences of the electronic device determining that the optical element is abnormal when the electronic device performs the abnormality detection on the optical element according to the speckle pattern. When the electronic device acquires the speckle pattern to detect the optical element, the electronic device can obtain the speckle pattern for abnormality detection when receiving a three-dimensional image acquisition request, can also obtain the speckle pattern for abnormality detection when the bio-assay is passed during the face recognition, and can also obtain the speckle pattern for abnormality detection on the optical element when the bio-assay is failed and the distance value between the face and the camera is larger than the preset distance. The electronic device can record the abnormal detection results of the optical element under different conditions.

When it is determined that the optical element is abnormal, the electronic device can record the number of abnormalities of the optical element and add one to the number of abnormalities of the optical element.

Figure 18:
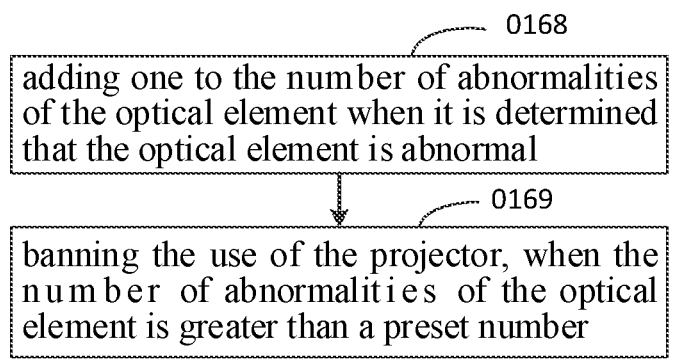
FIGS. 18 to 30 are schematic flow charts of a detection method of a projector according to embodiments of the present disclosure.

As illustrated in FIG. 18, in one embodiment, the detection method of the projector may further include the followings.

At block 0168, the number of abnormalities of the optical element is added by one when it is determined that the optical element is abnormal.

At block 0169, the use of the projector is banned when the number of abnormalities of the optical element is greater than a preset number.

The projector includes the light source, the collimating element and the optical element. The laser light is irradiated onto the object through the optical element to generate the speckle pattern. When the optical element is damaged, the intensity of the laser light that is irradiated onto the object increases, causing serious damage to the human eyes when it is irradiated to the human eyes. When the number of abnormalities of the optical element is greater than the preset number, the electronic device bans the use of the projector, such that the damage to the human eyes caused by the abnormality of the optical element can be reduced. When the number of abnormalities of the optical element is less than the preset number, the electronic device may issue a reminder indicating that the optical element is damaged to the user so as to reduce the use of the 3D image acquisition function or the face recognition function by the user, record the number of abnormalities of the optical element, and upload the abnormal result of the optical element to the server. The preset number can be determined according to requirements in the practical use process. In detail, in order to improve the use safety, the preset number may be a small value, for example, 3, or 5, but is not limited thereto.

When the number of abnormalities of the optical element is greater than the preset number, the electronic device bans the use of the projector. Since the abnormality of the optical element can be determined for many times and the use of the projector is banned when the number of abnormalities is greater than the preset number, the use safety of the projector can be improved while taking the detection accuracy into consideration.

In one embodiment, the detection method of the projector may be implemented as follows. The electronic device obtains the speckle pattern. The speckle pattern refers to an image generated by irradiating the laser light generated by the light source in the projector onto the object through the optical element. The speckle pattern is an image collected by the laser camera and generated by irradiating the laser light generated by the light source in the projector onto the object through the optical element. The electronic device obtains the structured light pattern projected by the projector to the object, and collects the speckle pattern through the laser camera after the structured light pattern is reflected by the object. The projector of the electronic device can be a laser light. The projector includes the light source, the collimating element, and the optical element. The light source may be a surface emitting laser or a vertical cavity surface laser array. The optical element can be a DOE, frosted glass, or a combination of both. The laser camera includes an image sensor, a lens, or the like, and the image sensor may be CMOS, CCD, or the like.

The electronic device obtains the zero-order region in the speckle pattern and the average brightness of the zero-order region according to the speckle pattern, and the zero-order region is the region with the maximum brightness. In the case that the optical element is abnormal, the brightness of the central region of the speckle pattern is abnormal due to the optical characteristics of the laser light. In detail, due to the shooting distance, the zero-order region may be located at the center or the center-right position of the speckle pattern. The electronic device can traverse the speckle pattern by setting a search box of a preset size, take the region where the search box having the maximum brightness value as the zero-order region, and obtain the average brightness of the zero-order region. The average brightness of the zero-order region refers to an average of the brightnesses of pixels in the zero-order region.

In at least one embodiment, the electronic device adopts the positioning box of the preset size to traverse the preset region of the speckle pattern, and takes the region where the positioning box with the maximum brightness value is located as the zero-order region. The preset region of the speckle pattern refers to a preset maximum range of the region where the zero-order region is located. The positioning box of the preset size refers to a search box set according to a size of the zero-order region. The positioning box may be used to traverse the preset region of the speckle pattern with a horizontal traversal strategy or a vertical traversal strategy. The electronic device may further determine the location of the zero-order region in advance according to the brightness value of the position of the positioning box during the traversal process, determine the numbers of traversal times of different regions in the preset region according to the determination result, obtain the brightness value of the region where the positioning box is located during the traversal process, and take the region where the positioning box with the maximum brightness value is located as the zero-order region.

In at least one embodiment, the electronic device can also obtain a brightness value of the speckle pattern in the preset region, reduce the preset region, obtain a brightness value of the reduced preset region, and take the reduced preset region as the zero-order region when a difference between the brightness value of the reduced preset region and the brightness value of the latest preset region is less than a preset difference value. The preset region of the speckle pattern is the preset maximum range of the region where the zero-order region is located in the speckle pattern. The electronic device can obtain the brightness value of the speckle pattern in the preset region by acquiring the brightness value of each pixel point of the speckle pattern in the preset region, cyclically reduce the preset region to reduce the range of the region where the zero-order region is located, and take the reduced preset region as the zero-order region when the difference between the brightness value of the reduced preset region and the brightness value of the latest preset region is less than the preset difference value, i.e., the brightness value of the reduced preset region is the same as or close to the brightness value of the latest preset region.

In addition, the electronic device detects the average brightness of the peripheral region of the zero-order region in the speckle pattern. The electronic device can detect the average brightnesses of all the peripheral regions of the zero-order region, and can also obtain the average brightnesses of a part of peripheral regions of the zero-order region by extracting the part of peripheral regions of the zero-order region. The number of the peripheral regions of the zero-order region extracted by the electronic device can be determined according to the actual application requirements and the detection effect. In detail, the electronic device may extract, but is not limited to, 4, 8 or 12 peripheral regions of the zero-order region.

In at least one embodiment, the electronic device can acquire the first number of peripheral regions of the zero-order region in the speckle pattern, and the first number of peripheral regions of the zero-order region may have the same size as the zero-order region, or may be have different sizes from the zero-order region, for example, twice the size of the zero-order region, or a size smaller than that of the zero-order region.

In at least one embodiment, the electronic device can obtain the first number of peripheral regions, in which the horizontal distance between the peripheral region and the zero-order region and the vertical distance between the peripheral region and the zero-order region are both no more than zero. The horizontal distance between the peripheral region and the zero-order region no more than 0 means that in the horizontal direction, an edge of the obtained peripheral region coincides with the zero-order region or an edge of the zero-order region. Similarly, the vertical distance between the peripheral region and the zero-order region no more than 0 means that in the vertical direction, an edge of the obtained peripheral region coincides with the zero-order region or an edge of the zero-order region. The positions where the first number of peripheral regions each having the horizontal distance and the vertical distance to the zero-order region no more than 0 are located may not coincide with the position where the zero-order region is located.

The electronic device determines that the optical element is abnormal when the ratio of the average brightness of the zero-order region to the average brightness of the peripheral region of the zero-order region is greater than the first threshold. The first threshold may be a ratio of the average brightness of the zero-order region to that of the peripheral region when the laser light generated by the light source in the projector is irradiated onto the object through the optical element having a perforation or a scratch. In the case that the electronic device obtains the average brightnesses of all the peripheral regions of the zero-order region, when the ratio of the average brightness of the zero-order region to the average brightnesses of all the peripheral regions is greater than the first threshold, it is determined that the optical element is abnormal. In the case that the electronic device extracts the average brightnesses of a part of peripheral regions of the zero-order region, when the ratio of the average brightness of the zero-order region to the average brightnesses of the part of peripheral regions is greater than the first threshold, it is determined that the optical element is abnormal, and in this case, the optical element may have perforations or scratches, the electronic device can alert the user and upload the test results to the server.

In at least one embodiment, the electronic device determines that the optical element is severely abnormal when the ratio of the average brightness of the zero-order region to the average brightness of the peripheral region of the zero-order region is greater than the second threshold, the second threshold is greater than the first threshold. The second threshold may be a ratio of the average brightness of the zero-order region to the average brightness of the peripheral region when the laser light generated by the light source in the projector is directly irradiated onto the object. The second threshold may also be a ratio of the average brightness of the zero-order region to the average brightness of the peripheral region when the laser light generated by the light source in the projector is irradiated onto the object through the optical element having a large perforation. When the ratio of the average brightness of the zero-order region to the average brightnesses of all the peripheral regions is greater than the second threshold, it is determined that the optical element is severely abnormal, and in this case, the optical element may be seriously damaged or completely detached. The electronic device may ban the use of the projector when it is determined that the optical element is severely abnormal.

In at least one embodiment, the electronic device adds one to the number of abnormalities of the optical element, when the optical element is determined to be abnormal. The number of abnormalities of the optical element is the times of occurrences of the electronic device determining that the optical element is abnormal when the electronic device performs the abnormality detection on the optical element according to the speckle pattern. When the electronic device obtains the speckle pattern for abnormality detection on the optical element, the electronic device can obtain the speckle pattern for abnormality detection when receiving a 3D image acquisition request, can also obtain the speckle pattern for abnormality detection when the bio-assay is passed in the face recognition, and can also obtain the speckle pattern for abnormality detection on the optical element when the bio-assay is failed and the distance value between the camera and the face is greater than the preset distance. The electronic device can record the abnormal detection results of the optical element under different conditions.

In at least one embodiment, the electronic device can ban the use of the projector, when the number of abnormalities of the optical element is greater than the preset number. The projector includes the light source, the collimating element and the optical element. The preset number can be determined according to requirements in the practical use process. In detail, in order to improve the use safety, the preset number may be a small value, for example, 3, or 5, but is not limited thereto. The laser light is irradiated onto the object through the optical element to generate the speckle pattern. When the optical element is damaged, the intensity of the laser light that is irradiated onto the object increases, causing serious damage to the human eyes when it is irradiated to the human eyes. When the number of abnormalities of the optical element is greater than the preset number, the electronic device bans the use of the projector, such that the damage to the human eyes caused by the abnormality of the optical element can be reduced. When the number of abnormalities of the optical element is less than the preset number, the electronic device may issue a reminder indicating that the optical element is damaged to the user so as to reduce the use of the 3D image acquisition function or the face recognition function by the user, record the number of abnormalities of the optical element, and upload the abnormal result of the optical element to the server.

Figure 19:
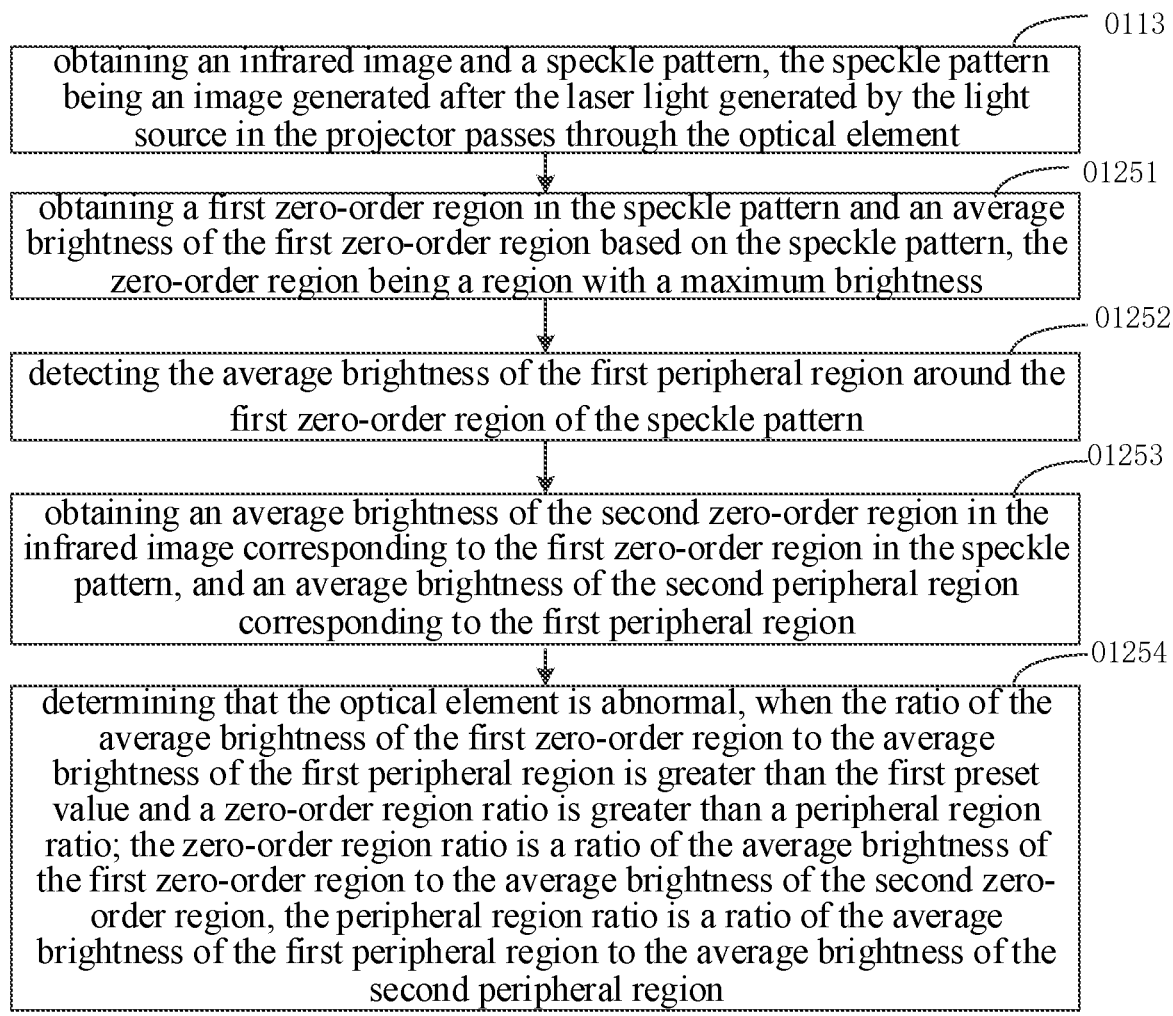

FIG. 19 is a flow chart illustrating a detection method of a projector in an embodiment of the present disclosure. As illustrated in FIG. 19, the detection method of the projector includes the acts at blocks 011 and 012, and the act at block 011 includes the followings.

At block 0113, an infrared image and the speckle pattern are obtained, the speckle pattern is an image generated after the laser light generated by the light source in the projector passes through the optical element.

The infrared image is an image formed through controlling the floodlight by the electronic device to emit infrared light onto the object, and collected by the infrared camera based on the light reflected by the object. The floodlight is a surface light source capable of generating infrared light. The speckle pattern refers to a speckle image generated by irradiating the laser light generated by the light source in the projector onto the object through the optical element and collected by the laser camera. The projector of the electronic device can be a laser light. The projector includes the light source, the collimating element and the optical element. The light source may be a surface emitting laser or a vertical cavity surface laser array. The optical element may be a DOE, frosted glass or a combination of both. The laser camera includes an image sensor, a lens, or the like, and the image sensor may be CMOS, CCD, or the like.

The electronic device collects the infrared image formed by the light emitted by the floodlight and reflected by the object and the speckle pattern generated by irradiating the laser generated by the light source in the projector onto the object through the optical element.

The act at block 012 includes the followings.

At block 01251, a first zero-order region in the speckle pattern and an average brightness of the first zero-order region are obtained according to the speckle pattern, the first zero-order region is a region with a maximum brightness.

The zero-order region is the region with the maximum brightness value in the speckle pattern. In the case that the optical element is abnormal, a brightness of a central region of the speckle pattern is abnormal due to optical characteristics of the laser light. In detail, due to the shooting distance, the zero-order region may be located at the center of the speckle pattern or at the center-right position of the speckle pattern. In detail, the electronic device can traverse the speckle pattern by setting a search box of a preset size, take the region where the search box having the maximum brightness value is located as the first zero-order region, and obtain the average brightness of the first zero-order region. The average brightness of the first zero-order region refers to an average of brightnesses of pixels in the first zero-order region.

The electronic device searches for the region with the maximum brightness in the speckle pattern as the zero-order region, and obtains the average brightness of the zero-order region.

At block 01252, an average brightness of the first peripheral region of the first zero-order region in the speckle pattern is obtained.

The first peripheral region of the first zero-order region in the speckle pattern refers to a region other than the region where the zero-order region is located in the speckle pattern. In detail, the electronic device can detect average brightnesses of all the peripheral regions of the first zero-order region, and can also obtain average brightnesses of a part of peripheral regions of the first zero-order region by extracting the part of peripheral regions of the first zero-order region. The number of the peripheral regions of the first zero-order region extracted by the electronic device can be determined according to the actual application requirements and the detection effect. In detail, the electronic device may extract, but is not limited to, 4, 8 or 12 peripheral regions of the zero-order region.

The electronic device detects a brightness value of each pixel point in the peripheral region of the zero-order region by obtaining the peripheral region of the zero-order region, and calculates an average of the brightness values of the pixel points as the average brightness of the peripheral region of the zero-order region.

At block 01253, an average brightness of a second zero-order region in the infrared image corresponding to the first zero-order region in the speckle pattern, and an average brightness of a second peripheral region in the infrared image corresponding to the first peripheral region in the speckle pattern are obtained.

The electronic device acquires the average brightness of the second zero-order region in the infrared image corresponding to a position of the first zero-order region in the speckle pattern. The electronic device acquires the average brightness of the second peripheral region in the infrared image corresponding to a position of the first peripheral region in the speckle pattern. In detail, when the electronic device acquires all the regions except the first zero-order region in the speckle pattern as the first peripheral region in the speckle pattern, the average brightness of all the regions except the second zero-order region in the infrared image is taken as the average brightness of the second peripheral region. When the electronic device acquires a part of regions other than the first zero-order region in the speckle pattern as the first peripheral region, the average brightness of the part of regions other than the second zero-order region in the infrared image is acquired correspondingly. The number of the second peripheral regions in the infrared image extracted by the electronic device and the sizes of the extracted second peripheral regions correspond respectively to the number of the first peripheral regions in the speckle pattern and the sizes of the extracted first peripheral regions. The electronic device calculates the average brightness of the second zero-order region and the average brightness of the second peripheral region by acquiring brightness values of pixel points in the infrared image corresponding to the positions of the first zero-order region and the first peripheral region.

At block 01254, it is determined that the optical element is abnormal, when a ratio of the average brightness of the first zero-order region to the average brightness of the first peripheral region is greater than a first preset value and a zero-order region ratio is greater than a peripheral region ratio. The zero-order region ratio is a ratio of the average brightness of the first zero-order region to the average brightness of the second zero-order region, the peripheral region ratio is a ratio of the average brightness of the first peripheral region to the average brightness of the second peripheral region.

The first preset value can be determined according to experimental data and actual application effects. The first preset value may be a ratio of the average brightness of the zero-order region to that of the peripheral region when the laser light generated by the light source in the projector is irradiated onto the object through the optical element having a perforation or a scratch. The electronic device determines that the optical element is abnormal when the ratio of the average brightness of the first zero-order region to the average brightness of the first peripheral region is greater than the first preset value and the zero-order region ratio is greater than the peripheral region ratio. In this case, the optical element may have perforations or scratches, the electronic device can alert the user and upload the test results to the server. When the ratio of the average brightness of the first zero-order region to the average brightness of the first peripheral region is greater than the first preset value but the zero-order region ratio is less than or equal to the peripheral region ratio, the ratio of the average brightness of the first zero-order region to the average brightness of the first peripheral region being greater than the first preset value may be caused by presence of materials with high infrared emissivity in the speckle pattern, the electronic device determines that the optical element is normal.

When the optical element is damaged, the laser light may cause serious damage to the human eyes when it is irradiated to the human eyes, and the use safety is low. The detection method of the projector in the embodiment of the present disclosure obtains the infrared image and the speckle pattern generated after the laser light generated by the light source in the projector passes through the optical element, obtains the first zero-order region in the speckle pattern and the corresponding average brightness according to the speckle pattern, detects the average brightness of the first peripheral region of the first zero-order region, obtains the average brightness of the second zero-order region in the infrared image corresponding to the first zero-order region in the speckle pattern and the average brightness of the second peripheral region in the infrared image corresponding to the first peripheral region in the speckle pattern. When the ratio of the average brightness of the first zero-order region to the average brightness of the first peripheral region is greater than the first preset value and the ratio of the average brightness of the first zero-order region to the average brightness of the second zero-order region is greater than the ratio of the average brightness of the first peripheral region to the average brightness of the second peripheral region, it is determined that the optical element is abnormal. Since the optical element can be detected according to the average brightness of the zero-order region and the average brightness of the peripheral region in the speckle pattern and the average brightness of the corresponding zero-order region and the average brightness of the corresponding peripheral region in the infrared image, the influence of the brightness change of the zero-order region in the speckle pattern caused by the presence of the materials with high infrared emissivity on the test result of the optical element can be avoided, thereby improving the detection accuracy.

Figure 20:
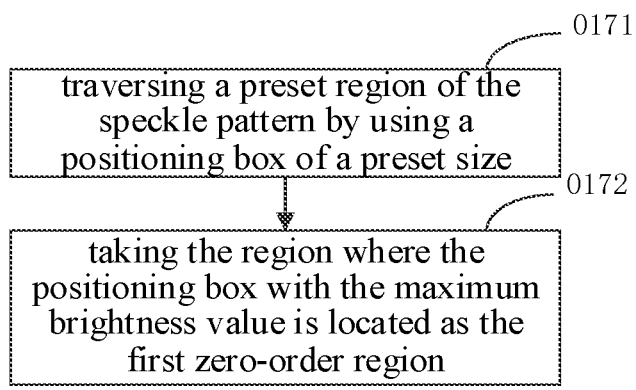

As illustrated in FIG. 20, in an embodiment, a process for obtaining the zero-order region and the average brightness thereof in the detection method of the projector may include the followings.

At block 0171, a positioning box of a preset size is applied to traverse a preset region of the speckle pattern.

The preset region of the speckle pattern refers to a preset maximum range of a region where the zero-order region is located. The positioning box of the preset size refers to a search box set according to a size of the zero-order region. In detail, the size of the preset region of the speckle pattern and the preset size of the positioning box may be determined according to experimental data or requirements in practical applications. The positioning box may be used to traverse the preset region of the speckle pattern with a horizontal traversal strategy or a vertical traversal strategy. The electronic device may further determine a location of the zero-order region in advance according to a brightness value of a position of the positioning box during the traversal process, and determine the numbers of traversal times of different regions in the preset region according to the determination result. For example, in a speckle pattern of 1000*1000 pixels, the preset region may be a region having 600*600 pixels and a center point coinciding with that of the speckle pattern. The positioning box of the preset size may be a positioning box of 30*30 pixels. The electronic device can traverse the preset region using the positioning box of 30*30 pixels. Under normal conditions, the number of traversal times is 100 when using the horizontal traversal strategy. In a horizontal traversal process, if a brightness value on the right side of the positioning box is greater than a brightness value on the left side of the positioning box, the electronic device can determine that the zero-order region is located in the right of the speckle pattern, and adjust the number of traversal times according to the determination result so as to reduce the number of traversal times in the left area.

At block 0172, a region where the positioning box with a maximum average brightness is located is taken as the first zero-order region.

The electronic device adopts the positioning box of the preset size to traverse the preset region of the speckle pattern, obtains the average brightness of the region where the positioning box is located during the traversal process, takes the region where the positioning box with the maximum average brightness is located as the first zero-order region, and obtains the average brightness of the first zero-order region at the same time.

By using the positioning box of the preset size to traverse the preset region of the speckle pattern, taking the region of the positioning box with the maximum brightness value as the first zero-order region, and obtaining the average brightness of the first zero-order region, the efficiency of acquiring the zero-order region can be improved.

Figure 21:
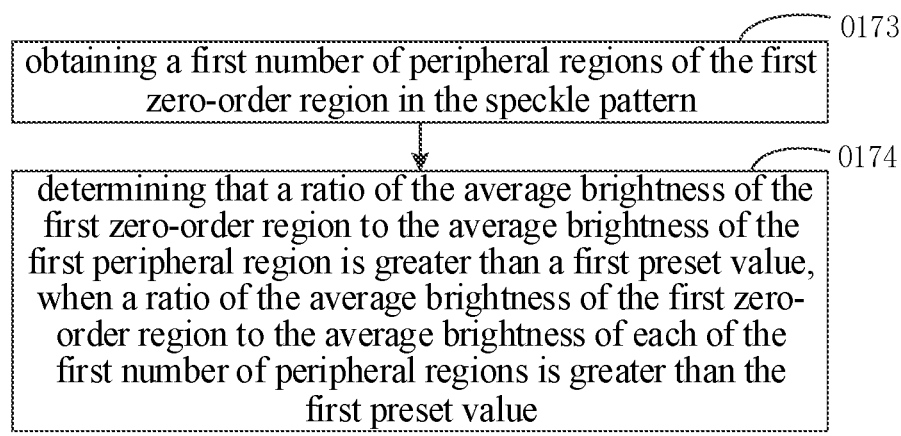

As illustrated in FIG. 21, in an embodiment, the detection method of the projector may further include the followings.

At block 0173, a first number of peripheral regions of the first zero-order region in the speckle pattern are obtained.

In detail, the first number of peripheral regions of the zero-order region may have the same size as the zero-order region, or may have different sizes from the zero-order region, for example, twice the size of the zero-order region, or a size smaller than that of the zero-order region. The first number of the peripheral regions of the zero-order region obtained by the electronic device may be 4, 8, 10, or the like, but is not limited thereto.

At block 0174, it is determined that a ratio of the average brightness of the first zero-order region to the average brightness of the first peripheral region is greater than a first preset value, when a ratio of the average brightness of the first zero-order region to the average brightness of each of the first number of peripheral regions is greater than the first preset value.

In the case that the electronic device obtains a plurality of peripheral regions of the first zero-order region, when the ratio of the average brightness of the first zero-order region to the average brightness of each of the plurality of peripheral regions is greater than the first preset value, it is determined that the ratio of the average brightness of the first zero-order region to the average brightness of the first peripheral region is greater than the first preset value. When the ratio of the average brightness of the first zero-order region to the average brightness of at least one of the plurality of peripheral regions is less than the first preset value, it is determined that the ratio of the average brightness of the first zero-order region to the average brightness of the first peripheral region is no greater than the first preset value. For example, assuming that the average brightnesses of four peripheral regions of the first zero-order region obtained by the electronic device are respectively 80, 88, 93 and 100, and that the first preset value is 2, when the average brightness of the first zero-order region is 220, the ratios of the average brightness of the first zero-order region to the average brightnesses of the four peripheral regions are respectively 2.75, 2.50, 2.44 and 2.2, which are greater than the first preset value, then it is determined that the ratio of the average brightness of the first zero-order region to the average brightness of the first peripheral region is greater than the first preset value; when the average brightness of the first zero-order region is 180, the ratios of the average brightness of the first zero-order region to the average brightnesses of the four peripheral regions are respectively 2.25, 2.05, 1.94 and 1.8, since there is at least one ratio less than 2, it is determined that the ratio of the average brightness of the first zero-order region to the average brightness of the first peripheral region is less than or equal to the first preset value.

By extracting the first number of peripheral regions of the first zero-order region, when the ratio of the average brightness of the zero-order region to the average brightness of each of the first number of peripheral regions is greater than the first preset value, it is determined that the ratio of the average brightness of the first zero-order region to the average brightness of the first peripheral region is greater than the first preset value, such that a detection error caused by excessive brightnesses of some peripheral regions due to exposure time, object reflection or the like can be avoided, thus improving the detection accuracy.

In an embodiment, the detection method of the projector obtaining the first number of peripheral regions of the first zero-order region in the speckle pattern, includes: obtaining the first number of peripheral regions, in which a horizontal distance between the peripheral region and the first zero-order region and a vertical distance between the peripheral region and the first zero-order region are both no more than 0.

The horizontal distance between the peripheral region and the first zero-order region no more than 0 means that in the horizontal direction, an edge of the obtained peripheral region coincides with the first zero-order region or an edge of the first zero-order region. Similarly, the vertical distance between the peripheral region and the first zero-order region no more than 0 means that in the vertical direction, an edge of the obtained peripheral region coincides with the first zero-order region or an edge of the first zero-order region. The positions where the first number of peripheral regions each having the horizontal distance and the vertical distance to the first zero-order region no more than 0 are located may not coincide with the position where the first zero-order region is located. The first number of peripheral regions acquired by the electronic device may be two regions, four regions, eight regions, and the like, and is not limited thereto. The first number of peripheral regions acquired by the electronic device may have the same size as the first zero-order region, or may have a size larger or smaller than the size of the first zero-order region. When the ratio of the average brightness of the first zero-order region to the average brightnesses of the first number of peripheral regions is greater than the first preset value, it is determined that the ratio of the average brightness of the first zero-order region to the average brightness of the first peripheral region is greater than the first preset value. When at least one of the ratios of the average brightness of the first zero-order region to the average brightnesses of the first number of peripheral regions is less than the first preset value, it is determined that the ratio of the average brightness of the first zero-order region to the average brightness of the first peripheral region is less than or equal to the first preset value.

FIG. 17 is a schematic diagram of a peripheral region of the first zero-order region in the speckle pattern acquired by the electronic device according to an embodiment of the present disclosure. The first zero-order region A is the region with the maximum average brightness in the speckle pattern, and eight peripheral regions B are eight regions each having the horizontal distance and the vertical distance to the first zero-order region no more than 0 and the size consistent with that of the first zero-order region. The electronic device can detect the average brightnesses of the eight peripheral regions B. When the ratios of the average brightness of the first zero-order region A to the average brightnesses of the eight peripheral regions B are greater than the first preset value, it is determined that the ratio of the average brightness of the first zero-order region to the average brightness of the first peripheral region is greater than the first preset value. In other embodiments, the first peripheral region acquired by the electronic device may be consisted of four regions, six regions, and the like thereof, but is not limited thereto.

Figure 22:
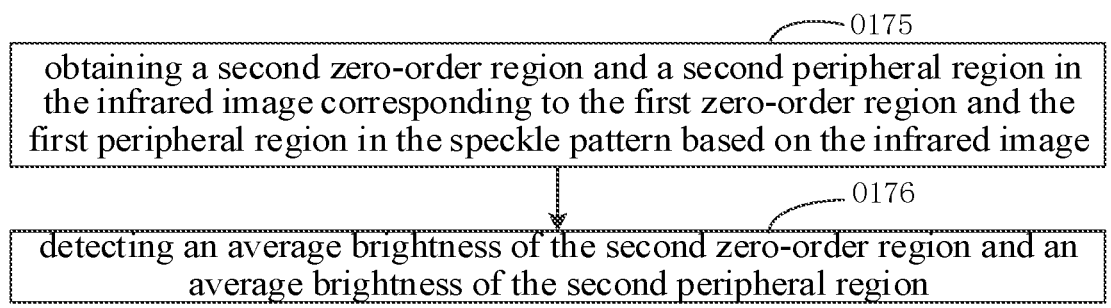

As illustrated in FIG. 22, in one embodiment, a process of obtaining the average brightness of the second zero-order region and the average brightness of the second peripheral region in the detection method of the projector includes the followings.

At block 0175, the second zero-order region and the second peripheral region in the infrared image corresponding respectively to the first zero-order region and the first peripheral region in the speckle pattern are obtained according to the infrared image.

The electronic device acquires the second zero-order region in the infrared image corresponding to the position of the first zero-order region in the speckle pattern. The position information of the second zero-order region in the infrared image corresponds to the position information of the first zero-order region in the speckle pattern. The electronic device acquires the second peripheral region in the infrared image corresponding to the position of the first peripheral region in the speckle pattern. When the electronic device acquires all the regions except the first zero-order region in the speckle pattern as the first peripheral region, all regions except the second zero-order region in the infrared image can be taken as the second peripheral region. When the electronic device acquires a part of regions other than the first zero-order region in the speckle pattern as the first peripheral region, the part of regions other than the second zero-order region in the infrared image are acquired correspondingly as the second peripheral region. The number of the second peripheral regions in the infrared image extracted by the electronic device and the sizes of the extracted second peripheral regions correspond respectively to the number of the first peripheral regions in the speckle pattern and the sizes of the extracted first peripheral regions.

At block 0176, the average brightness of the second zero-order region and the average brightness of the second peripheral region are detected.

The average brightness refers to an average of brightness values of all the pixel points in the region to be detected. After acquiring the second zero-order region and the second peripheral region in the infrared image, the electronic device may obtain the brightness value of each pixel point in the second zero-order region to calculate the average brightness of the second zero-order region, and acquire the brightness value of each pixel point in the second peripheral region to calculate the average brightness of the second peripheral region.

In one embodiment, the detection method of the projector, after determining that the optical element is abnormal, further includes adding one to the number of abnormalities of the optical element when determining that the optical element is abnormal.

The number of abnormalities of the optical element is the times of occurrences of the electronic device determining the abnormality of the optical element when the electronic device performs the abnormality detection on the optical element according to the speckle pattern. When the electronic device acquires the speckle pattern to detect the optical element, the electronic device can obtain the speckle pattern for abnormality detection when receiving the three-dimensional image acquisition request, can also obtain the speckle pattern for abnormality detection when the bio-assay is passed in the face recognition, and can also obtain the speckle pattern for abnormality detection on the optical element when the bio-assay is failed and the distance value between the face and the camera is greater than the preset distance. The electronic device can record the abnormal detection results of the optical elements under different conditions.

When it is determined that the optical element is abnormal, the electronic device can record the number of abnormalities of the optical element and add one to the number of abnormalities of the optical element.

Figure 23:
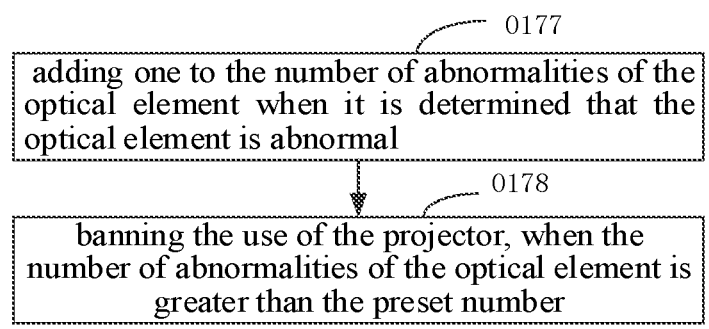

As illustrated in FIG. 23, in one embodiment, the detection method of the projector may further include the followings.

At block 0177, the number of abnormalities of the optical element is added by one when it is determined that the optical element is abnormal.

At block 0178, the use of the projector is banned, when the number of abnormalities of the optical element is greater than the preset number.

The projector includes the light source, the collimating element and the optical element. The laser light is irradiated onto the object through the optical element to generate the speckle pattern. When the optical element is damaged, the intensity of the laser light irradiated onto the object increases, causing serious damage to the human eyes when it is irradiated to the human eyes. When the number of abnormalities of the optical element is greater than the preset number, the electronic device bans the use of the projector, such that the damage to the human eyes caused by the abnormality of the optical element can be reduced. When the number of abnormalities of the optical element is less than the preset number, the electronic device may issue a reminder indicating that the optical element is damaged to the user so as to reduce the use of the three-dimensional image acquisition function or the face recognition function by the user, record the number of abnormalities of the optical element, and upload the abnormal result of the optical element to the server. The preset number can be determined according to requirements in the practical use process. In detail, in order to improve the use safety, the preset number may be a small value, for example, 3 or 5, but is not limited thereto.

The electronic device bans the use of the projector when the number of abnormalities of optical elements is greater than the preset number. Since the use of the projector can be banned when it is determined that the optical element is abnormal for many times and the number of abnormalities is greater than the preset number, the use safety of the projector can be improved while taking the detection accuracy into consideration.

In one embodiment, the detection method of the projector may be implemented as follows. The electronic device obtains the speckle pattern and the infrared image. The speckle pattern refers to an image generated after the laser light generated by the light source in the projector passes through the optical element. The infrared image refers to an image formed through controlling the floodlight by the electronic device to emit infrared light onto the object, and collected by the infrared camera based on the light reflected by the object. The floodlight is a surface light source capable of generating infrared light. The speckle pattern refers to a speckle image generated by irradiating the laser light generated by the light source in the projector onto the object through the optical element and collected by the laser camera. The projector of the electronic device can be a laser light. The projector includes the light source, the collimating element and the optical element. The light source may be a surface emitting laser or a vertical cavity surface laser array. The optical element may be a DOE, frosted glass or a combination of both. The laser camera includes an image sensor, a lens, or the like, and the image sensor may be CMOS, CCD, or the like.

The electronic device obtains the first zero-order region in the speckle pattern and the average brightness of the first zero-order region according to the speckle pattern, and the zero-order region is the region with the maximum brightness. In the case that the optical element is abnormal, the brightness of the central region of the speckle pattern is abnormal due to the optical characteristics of the laser light. In detail, due to the shooting distance, the zero-order region of the speckle pattern may be located at the center or the center-right position of the speckle pattern. The electronic device can traverse the speckle pattern by setting a search box of a preset size, take the region where the search box having the maximum brightness value is located as the first zero-order region, and obtain the average brightness of the first zero-order region. The average brightness of the first zero-order region refers to the average of the brightnesses of pixel points in the first zero-order region.

In at least one embodiment, the electronic device can traverse the preset region of the speckle pattern by using a positioning box of a preset size, and take the region where the positioning box having the maximum brightness value is located as the first zero-order region. The preset region of the speckle pattern refers to the preset maximum range of the region where the zero-order region is located. The positioning box of the preset size refers to a search box set according to the size of the zero-order region. The positioning box may be used to traverse the preset region of the speckle pattern with a horizontal traversal strategy or a vertical traversal strategy. The electronic device may further determine the location of the zero-order region in advance according to the brightness value of the position of the positioning box during the traversal process, determine the numbers of traversal times of different regions in the preset region according to the determination result, obtain the brightness value of the region where the positioning box is located during the traversal process, and take the region where the positioning box with the maximum brightness value is located as the first zero-order region.

In at least one embodiment, the electronic device can also obtain the brightness value of the speckle pattern in the preset region, reduce the preset region, obtain the brightness value of the reduced preset region, and take the reduced preset region as the first zero-order region when the difference between the brightness value of the reduced preset region and the brightness value of the latest preset region is less than the preset difference value. The preset region of the speckle pattern is the preset maximum range of the region where the zero-order region is located in the speckle pattern. The electronic device can obtain the brightness value of the speckle pattern in the preset region by acquiring the brightness value of each pixel point of the speckle pattern in the preset region, cyclically reduce the preset region to reduce the range of the region where the zero-order region is located, and take the reduced preset region as the first zero-order region when the difference between the brightness value of the reduced preset region and the brightness value of the latest preset region is less than the preset difference value, i.e., the brightness value of the reduced preset region is the same as or close to the brightness value of the latest preset region.

In addition, the electronic device detects the average brightness of the first peripheral region of the first zero-order region. The first peripheral region of the first zero-order region refers to the region other than the region where the zero-order region is located in the speckle pattern. In detail, the electronic device can detect the average brightnesses of all peripheral regions of the first zero-order region in the speckle pattern, and can also obtain the average brightnesses of a part of peripheral regions of the first zero-order region by extracting the part of peripheral regions of the first zero-order region. The number of the peripheral regions of the first zero-order region extracted by the electronic device can be determined according to the actual application requirements and the detection effect. In detail, the electronic device may extract, but is not limited to, 4, 8 or 12 peripheral regions of the zero-order region.

In at least one embodiment, the electronic device can acquire the first number of peripheral regions of the first zero-order region in the speckle pattern. The first number of peripheral regions of the first zero-order region may have the same size as the first zero-order region, or may have different sizes from the first zero-order region, for example, twice the size of the first zero-order region, or a size smaller than that the first zero-order region.

In at least one embodiment, the electronic device can obtain the first number of peripheral regions, in which the horizontal distance between the peripheral region and the first zero-order region and the vertical distance between the peripheral region and the first zero-order region are no more than zero. The horizontal distance between the peripheral region and the first zero-order region no more than 0 means that in the horizontal direction, an edge of the obtained peripheral region coincides with the first zero-order region or an edge of the first zero-order region. Similarly, the vertical distance between the peripheral region and the first zero-order region no more than 0 means that in the vertical direction, an edge of the obtained peripheral region coincides with the first zero-order region or an edge of the first zero-order region. The positions where the first number of peripheral regions each having the horizontal distance and the vertical distance to the first zero-order region no more than 0 are located may not coincide with the position where the first zero-order region is located.

The electronic device obtains the average brightness of the second zero-order region in the infrared image corresponding to the first zero-order region in the speckle pattern, and the average brightness of the second peripheral region in the infrared image corresponding to the first peripheral region in the speckle pattern. The electronic device calculates the average brightness of the second zero-order region and the average brightness of the second peripheral region by acquiring the brightness values of pixel points in the infrared image corresponding to the positions of the first zero-order region and the first peripheral region. In detail, when the electronic device acquires all the regions except the first zero-order region in the speckle pattern as the first peripheral region, the average brightness of all regions except the second zero-order region in the infrared image is taken as the average brightness of the second peripheral region. When the electronic device acquires a part of regions other than the first zero-order region in the speckle pattern as the first peripheral region, the average brightness of the part of regions other than the second zero-order region in the infrared image is acquired correspondingly. The number of the second peripheral regions in the infrared image extracted by the electronic device and the sizes of the extracted second peripheral regions correspond respectively to the number of the first peripheral regions in the speckle pattern and the sizes of the extracted first peripheral regions.

In at least one embodiment, the electronic device acquires the second zero-order region and the second peripheral region corresponding respectively to the first zero-order region and the first peripheral region in the speckle pattern according to the infrared image, and detects the average brightness of the second zero-order region and the average brightness of the second peripheral region. The electronic device acquires the second zero-order region in the infrared image corresponding to the location of the first zero-order region in the speckle pattern. The position information of the second zero-order region in the infrared image corresponds to the position information of the first zero-order region in the speckle pattern. The electronic device acquires the second peripheral region in the infrared image corresponding to the location of the first peripheral region in the speckle pattern. When the electronic device acquires all the regions except the first zero-order region in the speckle pattern as the first peripheral region, all regions except the second zero-order region in the infrared image can be acquired as the second peripheral region. When the electronic device acquires a part of regions other than the first zero-order region in the speckle pattern as the first peripheral region, the part of regions other than the second zero-order region in the infrared image can be acquired as the second peripheral region. The average brightness refers to the average of the brightness values of all the pixel points in the region to be detected. After acquiring the second zero-order region and the second peripheral region in the infrared image, the electronic device may obtain the brightness value of each pixel point in the second zero-order region to calculate the average brightness of the second zero-order region, and obtain the brightness value of each pixel point in the second peripheral region to calculate the average brightness of the second peripheral region.

In addition, the electronic device determines that the optical element is abnormal, when the ratio of the average brightness of the first zero-order region to the average brightness of the first peripheral region is greater than the first preset value and the zero-order region ratio is greater than the peripheral region ratio. The zero-order region ratio is a ratio of the average brightness of the first zero-order region to the average brightness of the second zero-order region, the peripheral region ratio is a ratio of the average brightness of first peripheral region to the average brightness of the second peripheral region. The first preset value may be a ratio of the average brightness of the zero-order region to the average brightness of the peripheral region when the laser light generated by the light source in the projector is irradiated onto the object through the optical element having a perforation or a scratch. The electronic device determines that the optical element is abnormal when the ratio of the average brightness of the first zero-order region to the average brightness of the first peripheral region is greater than the first preset value and the zero-order region ratio is greater than the peripheral region ratio. In this case, the optical element may have perforations or scratches, the electronic device can alert the user and upload the test results to the server. When the ratio of the average brightness of the first zero-order region to the average brightness of the first peripheral region is greater than the first preset value but the zero-order region ratio is less than or equal to the peripheral region ratio, the ratio of the average brightness of the first zero-order region to the average brightness of the first peripheral region being greater than the first preset value may be caused by the presence of the materials with high infrared emissivity in the speckle pattern, the electronic device determines that the optical element is normal.

In at least one embodiment, the electronic device may further determine that the optical element is abnormal, when the ratio of the average brightness of the first zero-order region to the average brightness of the first peripheral region is greater than the first preset value and a ratio of the zero-order region ratio to the peripheral region ratio is greater than a second preset value. The second preset value may be determined according to the experimental data, and may be, for example, 1.1, 1.2, or the like. When the ratio of the average brightness of the first zero-order region to the average brightness of the first peripheral region is greater than the first preset value and the ratio of the zero-order region ratio to the peripheral region ratio is greater than the second preset value, the optical element is determined to be abnormal, such that the situation that the first zero-order region in the speckle pattern is brighter than the second zero-order region in the infrared image caused by an environmental factor or a detection error can be avoided, thus improving the detection accuracy.

In at least one embodiment, the electronic device adds one to the number of abnormalities of the optical element, when the optical element is determined to be abnormal. The number of abnormalities of the optical element is the times of occurrences of the electronic device determining that the optical element is abnormal when the electronic device performs the abnormality detection on the optical element according to the speckle pattern. When the electronic device obtains the speckle pattern to detect optical element, the electronic device can obtain the speckle pattern for abnormality detection when receiving the 3D image acquisition request, can also obtain the speckle pattern for abnormality detection when the bio-assay is passed in the face recognition, and can also obtain the speckle pattern for abnormality detection on the optical element when the bio-assay is failed and the distance value between the camera and the face is greater than the preset distance. The electronic device can record the abnormal detection results of the optical element under different conditions.

In at least one embodiment, the electronic device can ban the use of the projector, when the number of abnormalities of the optical element is greater than the preset number. The projector includes the light source, the collimating element and the optical element. The preset number can be determined according to the requirements in the practical use process. In detail, in order to improve the use safety, the preset number may be a small value, for example, 3 or 5, but is not limited thereto. The laser light is irradiated onto the object through the optical element to generate the speckle pattern. When the optical element is damaged, the intensity of the laser light that is irradiated onto the object increases, causing serious damage to the human eyes when it is irradiated to the human eyes. When the number of abnormalities of the optical element is greater than the preset number, the electronic device bans the use of the projector, such that the damage to the human eyes caused by the abnormality of the optical element can be reduced. When the number of abnormalities of the optical element is less than the preset number, the electronic device may issue a reminder indicating that the optical element is damaged to the user so as to reduce the use of the 3D image acquisition function or the face recognition function by the user, record the number of abnormalities of the optical element, and upload the abnormal result of the optical element to the server.

Figure 24:
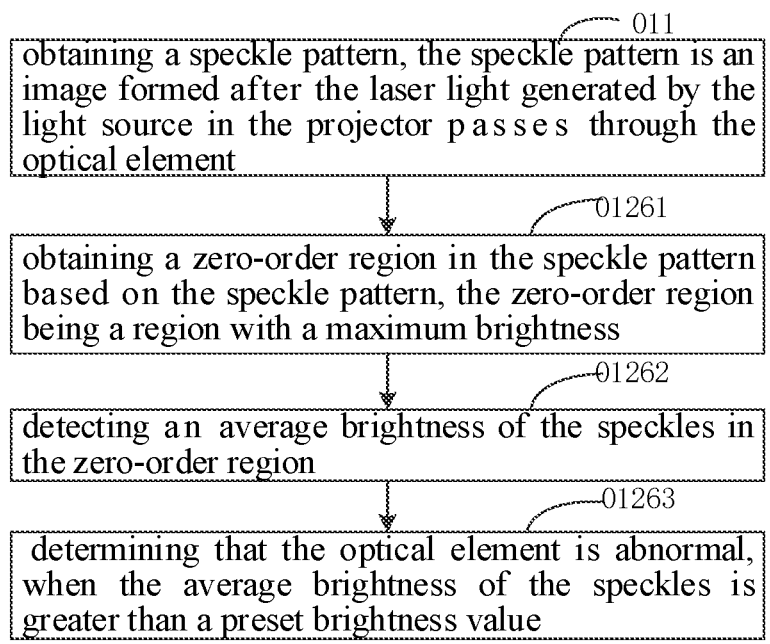

FIG. 24 is a flow chart of a detection method of a projector in one embodiment. As illustrated in FIG. 24, the detection method of the projector includes acts at block 011 and block 012.

At block 011, a speckle pattern is obtained, the speckle pattern is an image generated after laser light generated by a light source in the projector passes through an optical element.

The speckle pattern refers to a speckle image collected by a laser camera and generated by irradiating the laser light generated by the light source in the projector onto the object through the optical element. The projector of the electronic device can be a laser light. The projector includes the light source, a collimating element, and the optical element. The light source may be a surface emitting laser or a vertical cavity surface laser array. The optical element can be a DOE, frosted glass, or a combination of both. The laser camera includes an image sensor, a lens, or the like, and the image sensor may be CMOS, CCD, or the like.

The electronic device obtains a structured light pattern projected by the projector to the object, and collects the speckle pattern through the laser camera after the structured light pattern is reflected by the object.

The act at block 012 includes the followings.

At block 01261, a zero-order region in the speckle pattern is obtained according to the speckle pattern. The zero-order region is a region with a maximum brightness.

The zero-order region is the region with the maximum brightness value in the speckle pattern. The brightness value is an average of brightness values of pixel points. In the case that the optical element is abnormal, a brightness of a central region of the speckle pattern is abnormal due to optical characteristics of the laser light. In detail, due to a shooting distance, the zero-order region may be located at the center of the speckle pattern or at the center-right position of the speckle pattern. The electronic device can search for the region with the maximum brightness in the speckle pattern as the zero-order region. In detail, the electronic device can traverse the speckle pattern by setting a search box of a preset size, and take the region where the search box having the maximum brightness value is located as the zero-order region.

At block 01262, an average brightness of speckles in the zero-order region is detected.

A speckle is a pattern of a granular structure formed when the laser light is transmitted from inside a medium containing a scattering material such as a diffractive optical element, frosted glass, or a combination of both. The laser camera can capture a speckle pattern composed of a plurality of alternately bright and dark speckles. By obtaining a brightness value of each speckle, the average brightness of the speckles is calculated according to the number of the speckles and the brightness value of each speckle.

The electronic device can detect the brightnesses of the speckles in the zero-order region, and obtain the average brightness of the speckles in the zero-order region based on the brightnesses and the number of the speckles.

At block 01263, it is determined that the optical element is abnormal, when the average brightness of the speckles is greater than a preset brightness value.

The preset brightness value is a maximum brightness threshold of the speckle under a certain condition. In detail, the preset brightness value may be determined according to different formation conditions of the speckle pattern, acquisition conditions of the speckle pattern, and the like. In detail, the preset brightness value may be determined by factors such as a driving current of the light source in the projector, exposure time of the laser camera, or a combination of both. For example, when the optical element is not damaged, if the exposure time is 8 milliseconds, and the maximum brightness threshold of the speckle with a laser current of 0.6 amps is 180 nits, then the preset brightness value is set to 180. When the average brightness of the speckles is larger than 180, it is determined that the optical element is abnormal. When the average brightness of the speckles is less than 180, it indicates that the average brightness of the speckles is within a normal brightness range, and the optical element is not damaged.

The electronic device may obtain the preset brightness value according to the formation conditions and the acquisition conditions of the speckle pattern, and determine that the optical element is abnormal when the average brightness of the speckles in the zero-order region is greater than the preset brightness value.

When the optical element is damaged, the laser light may cause serious damage to the human eyes when it is irradiated to the human eyes, the use safety is low. The detection method of the projector in the embodiment of the present disclosure obtains the speckle pattern generated after the laser light generated by the light source in the projector passes through the optical element, obtains the zero-order region in the speckle pattern according to the speckle pattern, i.e., the region with the maximum brightness, detects the average brightness of the speckles in the zero-order region, and determines that the optical element is abnormal when the average brightness of the speckles is greater than the preset brightness value. Since the optical element can be detected by using the brightnesses of the speckles in the zero-order region, the detection accuracy is improved.

In one embodiment, the detection method of the projector further includes: obtaining the speckle pattern collected according to a preset exposure time and a preset laser current.

Exposure time refers to a time interval from opening a shutter to closing the shutter when the laser camera collects the speckle pattern. In detail, under other certain conditions, the brightness value of the speckle pattern increases with the exposure time. Laser current refers to the driving current of the light source in the projector. In detail, under other certain conditions, a luminescence power of the light source increases with the laser current, such that the brightnesses of the speckles in the speckle pattern also increase. For example, the electronic device can set the exposure time of the laser camera to 8 milliseconds and the laser current to 0.5 amp to obtain the speckle pattern, search for the maximum brightness threshold of the speckle corresponding to the exposure time of 8 milliseconds and the laser current of 0.5 amp based on the exposure time and the laser current of the speckle pattern, and determine whether the optical element is abnormal.

In the case that the optical element is abnormal, the speckle pattern collected with the preset laser current and the preset exposure time is acquired, and the corresponding preset brightness value, i.e., the maximum brightness threshold is searched according to the preset exposure time and the preset laser current. When the average brightness of the speckles in the zero-order region is greater than the preset brightness value, i.e., the maximum brightness threshold of the speckle, it is determined that the optical element is abnormal, such that the detection accuracy of the optical element is improved.

Figure 25:
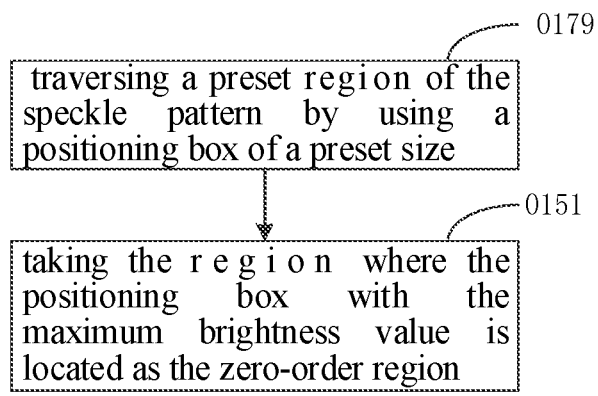

As illustrated in FIG. 25, in one embodiment, a process for acquiring the zero-order region in the detection method of the projector may include the followings.

At block 0179, a positioning box of a preset size is applied to traverse a preset region of the speckle pattern.

The preset region of the speckle pattern refers to a preset maximum range of a region where the zero-order region is located. The positioning box of the preset size refers to a search box set according to a size of the zero-order region. In detail, a size of the preset region of the speckle pattern and the preset size of the positioning box may be determined according to experimental data or requirements in practical applications. The positioning box may be used to traverse the preset region of the speckle pattern with a horizontal traversal strategy or a vertical traversal strategy. The electronic device may further determine a location of the zero-order region in advance according to a brightness value of a position of the positioning box during the traversal process, and determine the numbers of traversal times of different regions in the preset region according to the determination result. For example, in a speckle pattern of 1000*1000 pixels, the preset region may be a region having 600*600 pixels and a center point coinciding with that of the speckle pattern. The positioning box of the preset size may be a positioning box of 30*30 pixels. The electronic device can traverse the preset region using the positioning box of 30*30 pixels. Under normal conditions, the number of traversal times is 100 when using the horizontal traversal strategy. In a horizontal traversal process, when the brightness value on the right side of the positioning box is greater than the brightness value on the left side of the positioning box, the electronic device can determine that the zero-order region is located in the right of the speckle pattern, and adjust the number of traversal times according to the determination result so as to reduce the number of traversal times in the left area.

At block 0181, a region where the positioning box with a maximum brightness value is located is taken as the zero-order region.

The electronic device adopts the positioning box of the preset size to traverse the preset region of the speckle pattern, obtains the brightness value of the region where the positioning box is located during the traversal process, and takes the region where the positioning box with the maximum brightness value is located as the zero-order region.

By using the positioning box of the preset size to traverse the preset region of the speckle pattern, and taking the region of the positioning box with the maximum brightness value as the zero-order region, the efficiency of acquiring the zero-order region can be improved.

Figure 26:
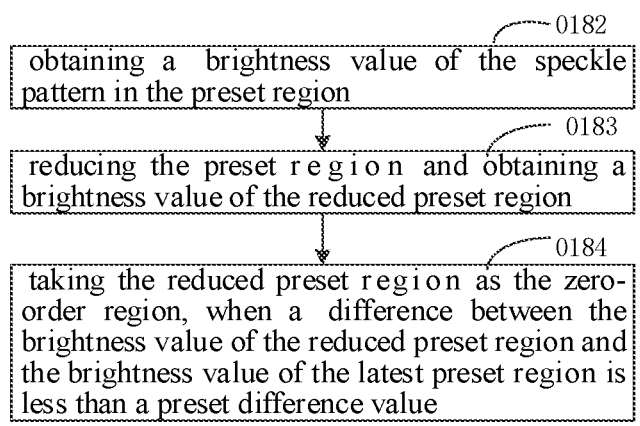

As illustrated in FIG. 26, in one embodiment, a process for acquiring the zero-order region in the detection method of the projector may include the followings.

At block 0182, a brightness value of the speckle pattern in the preset region is obtained.

In detail, the preset region of the speckle pattern is the preset maximum range of the region where the zero-order region is located in the speckle pattern. The electronic device can obtain the brightness value of the speckle pattern in the preset region by acquiring a brightness value of each pixel point of the speckle pattern in the preset region.

At block 0183, the preset region is reduced and a brightness value of the reduced preset region is obtained.

In detail, a reduction range of the preset region may be determined according to requirements in actual applications. The electronic device can reduce the range of the region where the zero-order region is located by cyclically reducing the preset region. In the process of cyclically reducing the preset region, the electronic device may further adjust a position of the preset region according to a change in the brightness value of the reduced preset region. For example, in a process of acquiring the zero-order region by reducing the preset region, when the brightness value of the reduced preset region detected by the electronic device is lower than the brightness value of the latest preset region, it is determined that the latest preset region partially overlaps with the zero-order region, the electronic device can determine a new preset region by moving the position of the preset region and obtaining the brightness value of the corresponding preset region, cyclically reduce the preset region and obtain the brightness value of the reduced preset region.

At block 0184, the reduced preset region is taken as the zero-order region, when a difference between the brightness value of the reduced preset region and the brightness value of the latest preset region is less than a preset difference value.

When the difference between the brightness value of the reduced preset region and the brightness value of the latest preset region is less than the preset difference value, i.e., the brightness value of the reduced preset region is the same as or close to the brightness value of the latest preset region, the reduced preset region is taken as the zero-order region.

By obtaining the brightness value of the speckle pattern in the preset region, cyclically reducing the preset region, obtaining the brightness value of the reduced preset region, and taking the reduced preset region as the zero-order region when the brightness value of the reduced preset region and the brightness value of the latest preset region are less than the preset threshold, the zero-order region can be acquired.

Figure 27:
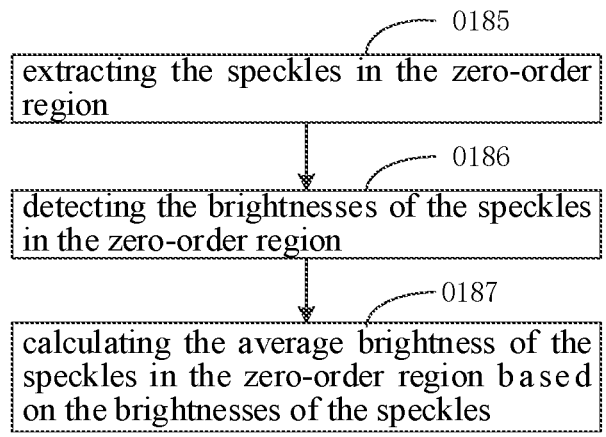

As illustrated in FIG. 27, in one embodiment, the detection method of the projector may further include the followings.

At block 0185, the speckles in the zero-order region are extracted.

A speckle is a pattern of a granular structure formed when the laser light is transmitted from inside a medium containing a scattering material such as a diffractive optical element, frosted glass, or a combination of both. In detail, the speckle may be a speckle pattern obtained when the laser light generated by the light source is projected to a plane through the optical element, or may be a speckle pattern obtained when the laser light generated by the light source is modulated by a human body or other target object after passing through the optical element in the case that there is a human body or other target object in the space. The speckles in the zero-order region may contain all the speckles in the zero-order region, and may also include speckles on the edge of the zero-order region.

After determining the position of the zero-order region, the electronic device can extract the speckles in the zero-order region according to the position of the zero-order region.

At block 0186, the brightnesses of the speckles in the zero-order region are detected.

The brightness of the speckle is affected by the laser current, the exposure time of the laser camera, and the intensity of light in the shooting space. The electronic device can detect the brightness value of each pixel point in the speckle, and calculate an average brightness of the pixel points in the speckle as the brightness of the speckle.

At block 0187, the average brightness of the speckles in the zero-order region is calculated according to the brightnesses of the speckles.

The average brightness of the speckles in the zero-order region is an average brightness of all the speckles in the zero-order region. The electronic device can detect the brightnesses of the speckles in the zero-order region according to the extracted speckles in the zero-order region, and obtain the average brightness of the speckles according to the number and the brightnesses of speckles.

The electronic device obtains the average brightness of the speckles in the zero-order region by extracting the speckles in the zero-order region and detecting the brightnesses of the speckles in the zero-order region, and determines that the optical element is abnormal when the average brightness of the speckles is greater than the preset brightness value. The detection accuracy can be improved by detecting the optical element using the average brightness of the speckles.

In an embodiment, the detection method of the projector, after determining that the optical element is abnormal, further includes: adding one to the number of abnormalities of the optical element when it is determined that the optical element is abnormal.

The number of abnormalities of the optical element is the times of occurrences of the electronic device determining that the optical element is abnormal when the electronic device performs the abnormality detection on the optical element according to the speckle pattern. When the electronic device acquires the speckle pattern to detect the optical element, the electronic device can obtain the speckle pattern for abnormality detection when receiving the three-dimensional image acquisition request, can also obtain the speckle pattern for abnormality detection when the bio-assay is passed during the face recognition, and can also obtain the speckle pattern for abnormality detection on the optical element when the bio-assay is failed and the distance value between the face and the camera is greater than the preset distance. The electronic device can record the abnormal detection results of the optical element under different conditions.

When it is determined that the optical element is abnormal, the electronic device can record the number of abnormalities of the optical element and add one to the number of abnormalities of the optical element.

Figure 28:
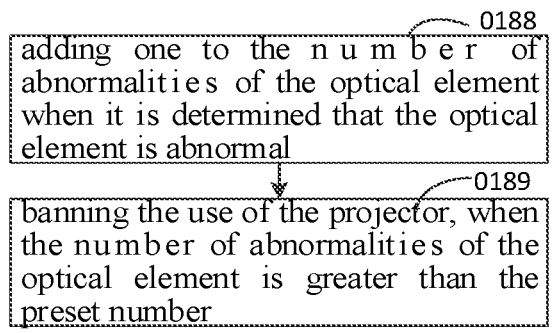

As illustrated in FIG. 28, in one embodiment, the detection method of the projector may further includes the followings.

At block 0188, the number of abnormalities of the optical element is added by one when it is determined that the optical element is abnormal.

At block 0189, the use of the projector is banned, when the number of abnormalities of the optical element is greater than a preset number.

The projector includes the light source, the collimating element and the optical element. The laser light is irradiated onto the object through the optical element to generate the speckle pattern. When the optical element is damaged, the intensity of the laser light that is irradiated onto the object increases, causing serious damage to the human eyes when it is irradiated to the human eyes. When the number of abnormalities of the optical element is greater than the preset number, the electronic device bans the use of the projector, such that the damage to the human eyes caused by the abnormality of the optical element can be reduced. When the number of abnormalities of the optical element is less than the preset number, the electronic device may issue a reminder indicating that the optical element is damaged to the user so as to reduce the use of the 3D image acquisition function or the face recognition function by the user, record the number of abnormalities of the optical element, and upload the abnormal result of the optical element to the server. The preset number can be determined according to requirements in the practical use process. In detail, in order to improve the use safety, the preset number may be a small value, for example, 3 or 5, but is not limited thereto.

When the number of abnormalities of the optical element is greater than the preset number, the electronic device bans the use of the projector. Since the abnormality of the optical element can be determined for many times and the use of the projector is banned when the number of abnormalities is greater than the preset number, the use safety of the projector can be improved while taking the detection accuracy into consideration.

In one embodiment, the detection method of the projector may be implemented as follows.

The electronic device obtains the speckle pattern. The speckle pattern is an image generated after the laser light generated by the light source in the projector passes through the optical element. The speckle pattern refers to an image generated by irradiating the laser light generated by the light source in the projector onto the object through the optical element and collected by the laser camera. The electronic device obtains the structured light pattern projected by the projector to the object, and collects the speckle pattern through the laser camera after the structured light pattern is reflected by the object. The projector of the electronic device can be a laser light. The projector includes the light source, the collimating element, and the optical element. The light source may be a surface emitting laser or a vertical cavity surface laser array. The optical element can be a DOE, frosted glass, or a combination of both. The laser camera includes an image sensor, a lens, or the like, and the image sensor may be CMOS, CCD, or the like.

In at least one embodiment, the electronic device obtains the speckle pattern acquired according to the preset exposure time and the preset laser current. Exposure time refers to the time interval from opening the shutter to closing the shutter when the laser camera collects the speckle pattern. Laser current refers to the driving current of the light source in the projector. The electronic device can acquire the speckle pattern collected with the preset exposure time and the preset laser current, search for the corresponding preset brightness value, i.e., the maximum brightness threshold according to the preset exposure time and the preset laser current, and determine that the optical element is abnormal when the average brightness of the speckles in the zero-order region is greater than the preset brightness value, i.e., the maximum brightness threshold of the speckle.

The electronic device acquires the zero-order region according to the speckle pattern, and the zero-order region is the region with the maximum brightness. The brightness value refers to the average of the brightness values of pixel points. In the case that the optical element is abnormal, due to the optical characteristics of the laser light, the brightness of the central region of the speckle pattern may be abnormal. In detail, due to the shooting distance, the zero-order region may be located at the center or the center-right position of the speckle pattern. The electronic device searches for the region having the maximum brightness in the speckle pattern as the zero-order region. In detail, the electronic device can traverse the speckle pattern by setting the search box of the preset size, and take the region where the search box having the maximum brightness value is located as the zero-order region.

In at least one embodiment, the electronic device can traverse the preset region of the speckle pattern using the positioning box of the preset size, and take the region where the positioning box having the maximum brightness value is located as the zero-order region. The preset region of the speckle pattern is the preset maximum range of the region where the zero-order region is located. The positioning box of the preset size refers to the search box set according to the size of the zero-order region. The positioning box may be used to traverse the preset region of the speckle pattern with the horizontal traversal strategy or the vertical traversal strategy. The electronic device may further determine the location of the zero-order region in advance according to the brightness value of the position of the positioning box during the traversal process, determine the numbers of traversal times of different regions in the preset region according to the determination result, obtain the brightness value of the region where the positioning box is located during the traversal process, and take the region where the positioning box with the maximum brightness value is located as the zero-order region.

In at least one embodiment, the electronic device can also obtain the brightness value of the speckle pattern in the preset region, reduce the preset region, obtain the brightness value of the reduced preset region, and take the reduced preset region as the zero-order region when the difference between the brightness value of the reduced preset region and the brightness value of the latest preset region is less than the preset difference value. The preset region of the speckle pattern is the preset maximum range of the region where the zero-order region is located in the speckle pattern. The electronic device can obtain the brightness value of the speckle pattern in the preset region by acquiring the brightness value of each pixel point of the speckle pattern in the preset region, cyclically reduce the preset region to reduce the range of the region where the zero-order region is located, and take the reduced preset region as the zero-order region when the difference between the brightness value of the reduced preset region and the brightness value of the latest preset region is less than the preset difference value, i.e., the brightness value of the reduced preset region is the same as or close to the brightness value of the latest preset region. In the process of cyclically reducing the preset region, the electronic device may further adjust the position of the preset region according to the change in the brightness value of the reduced preset region.

The electronic device detects the average brightness of the speckles in the zero-order region. The electronic device can detect the brightnesses of the speckles in the zero-order region, and obtain the average brightness of the speckles in the zero-order region based on the brightnesses of the speckles and the number of the speckles. A speckle is a pattern of a granular structure formed when the laser light is transmitted from inside a medium containing a scattering material such as a diffractive optical element, frosted glass, or a combination of both. The laser camera can capture a speckle pattern composed of a plurality of alternately bright and dark speckles. By obtaining the brightness of each speckle, the average brightness of the speckles is calculated according to the number of the speckles and the brightness of each speckle.

In at least one embodiment, the electronic device can extract the speckles in the zero-order region, detect the brightnesses of the speckles in the zero-order region, and obtain the average brightness of the speckles according to the brightnesses of the speckles. In detail, the speckle may be a speckle pattern obtained when the laser light generated by the light source is projected to the plane through the optical element, or may be a speckle pattern obtained when the laser light generated by the light source is modulated by a human body or other target object after passing through the optical element in the case that there is a human body or other target object in the space. After determining the position of the zero-order region, the electronic device can extract the speckles in the zero-order region according to the position of the zero-order region, detect the brightness value of each pixel point in the speckle, and calculate the average of the brightness values of pixel points in the speckle as the brightness of the speckle.

Then, when the average brightness of the speckles is greater than the preset brightness value, the electronic device determines that the optical element is abnormal. The electronic device may obtain a corresponding preset brightness value according to the formation conditions and the acquisition conditions of the collected speckle pattern, and determine that the optical element is abnormal when the average brightness of the speckles in the zero-order region is greater than the preset brightness value. The preset brightness value is the maximum brightness threshold of the speckle under a certain condition. In detail, the preset brightness value may be determined according to different formation conditions and the acquisition conditions of the speckle pattern, and the like. In detail, the preset brightness value may be determined by factors such as a driving current of the light source in the projector, an exposure time of the laser camera, or a combination of both.

In at least one embodiment, the electronic device adds one to the number of abnormalities of the optical element, when the optical element is determined to be abnormal. The number of abnormalities of the optical element is the times of occurrences of the electronic device determining that the optical element is abnormal when the electronic device performs the abnormality detection on the optical element according to the speckle pattern. When the electronic device obtains the speckle pattern to detect the optical element, the electronic device can obtain the speckle pattern for abnormality detection when receiving the 3D image acquisition request, can also obtain the speckle pattern for abnormality detection when the bio-assay is passed in the face recognition, and obtain the speckle pattern for abnormality detection on the optical element when the bio-assay is failed and the distance value between the camera and the face is greater than the preset distance. The electronic device can record the abnormal detection results of the optical element under different conditions.

In at least one embodiment, the electronic device can ban the use of the projector, when the number of abnormalities of the optical element is greater than the preset number. The projector includes the light source, the collimating element and the optical element. The preset number can be determined according to the requirements in the practical use process. In detail, in order to improve the use safety, the preset number may be a small value, for example, 3 or 5, but is not limited thereto. The laser light is irradiated onto the object through the optical element to generate the speckle pattern. When the optical element is damaged, the intensity of the laser light that is irradiated onto the object increases, causing serious damage to the human eyes when it is irradiated to the human eyes. When the number of abnormalities of the optical element is greater than the preset number, the electronic device bans the use of the projector, such that the damage to the human eyes caused by the abnormality of the optical element can be reduced. When the number of abnormalities of the optical element is less than the preset number, the electronic device may issue a reminder indicating that the optical element is damaged to the user so as to reduce the use of the 3D image acquisition function or the face recognition function by the user, record the number of abnormalities of the optical element, and upload the abnormal result of the optical element to the server.

Figure 29:
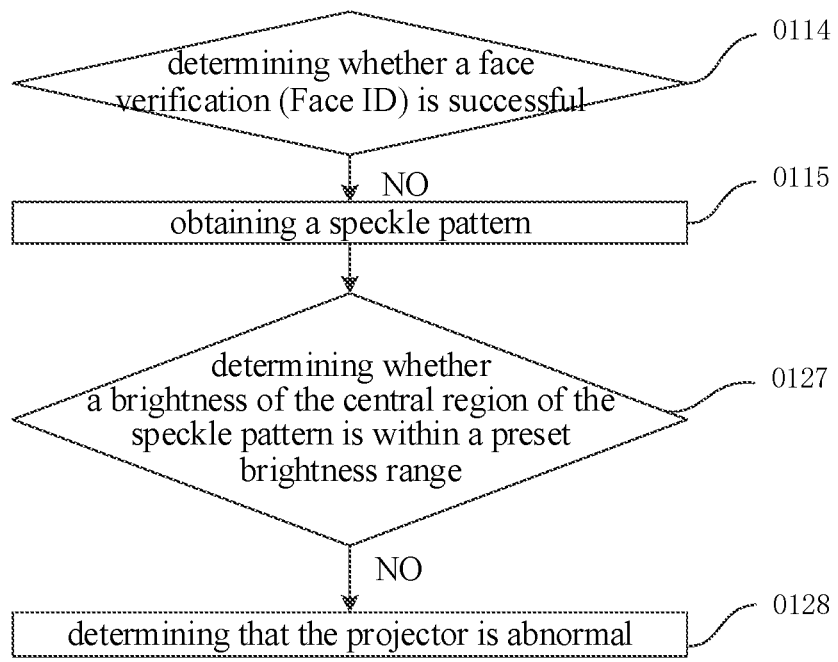

As illustrated in FIGS. 2 and 29, the detecting method of the projector 10 is applicable to the projector 10. The projector 10 can be the projector 10 of any one of the above embodiments or the projector in the related art, and the detection method includes the acts at block 011 and 012.

The act at block 011 includes the followings.

At block 0114, it is determined whether a face verification (Face ID) is successful.

At block 0115, a speckle pattern is obtained when the face verification is unsuccessful.

The act at block 012 includes the followings.

At block 0127, it is determined whether a brightness of a central region of the speckle pattern is within a preset brightness range.

At block 0128, it is determined that the projector is abnormal when the brightness of the central region is beyond the preset brightness range.

When the optical element is damaged, the laser light may cause serious damage to the human eyes when it is irradiated to the human eyes, and the use safety is low. The detection method of the projector 10 of the embodiment of the present disclosure determines whether the projector 10 is abnormal according to whether the brightness of the central region of the speckle pattern is within the preset brightness range when the face verification is unsuccessful, so that when the projector 10 is abnormal, the projector 10 may be turned off or a transmit power of the projector 10 is reduced, thereby avoiding the problem that the energy of the laser light emitted by the projector 10 is too high to cause harm to the user's body or eyes, and improving the use safety of the projector 10.

In detail, when the face verification is unsuccessful, it may be initially determined that the projector 10 may be abnormal. When the projector 10 is abnormal, if the abnormality indicates that a zero-order beam is too high, it may cause great damage to the human body. Since the zero-order beam generally exists in the central region of the speckle pattern, it can be determined whether the brightness of the central region of the speckle pattern is within the preset brightness range to determine whether the zero-order beam is over proof. The central region may refer to a region of the speckle pattern having a distance to the center of the speckle pattern less than a predetermined distance. The brightness of the central region may be an average brightness of the central region, or the maximum brightness or the minimum brightness of the central region, or a difference between the maximum brightness and the minimum brightness of the central region, which is not limited herein. The preset brightness range may be preset in the projector 10 or set by the user. When the brightness of the central region is beyond the preset brightness range, it indicates that the zero-order beam is over proof; and when the brightness of the central region is within the preset brightness range, it indicates that the zero-order beam is normal.

In some embodiments, the speckle pattern is acquired when the face verification is failed once. In this way, a sensitivity of the projector 10 to acquire the speckle pattern can be increased, thereby minimizing possible damage to the human body by the projector 10.

In some embodiments, the speckle pattern is obtained when the face verification is continuously unsuccessful for a predetermined number of times, such that a misjudgment of whether the face verification is successful may be reduced or avoided. The predetermined number of times may be set in the projector 10 in advance or set by the user, for example, 3 times, 5 times, 10 times, which is not limited herein. For example, when the predetermined number of times is three times, the speckle pattern is acquired only when the face verification is continuously unsuccessful for three times. When at least one of the three times of face verifications is successful, it is not required to acquire the speckle pattern.

In some embodiments, it is determined that the projector 10 is normal when the face verification is successful and the projector 10 can function normally.

In some embodiments, when the brightness of the central region of the speckle pattern is within the preset brightness range, it is impossible to determine the reason causing the face verification to be unsuccessful, and the user may be informed of an unknown error.

Figure 30:
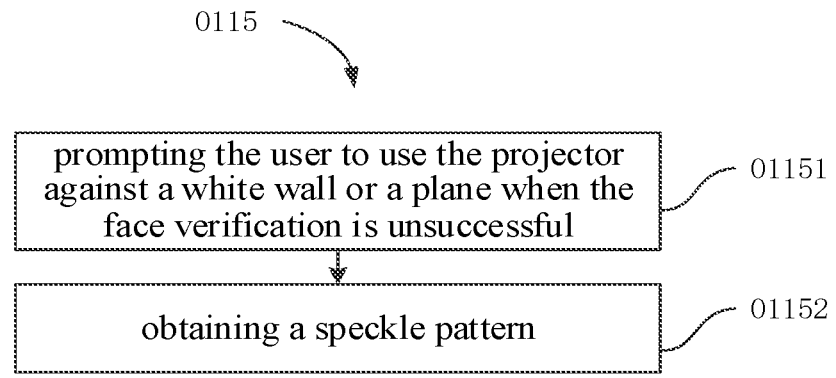

As illustrated in FIG. 30, in some embodiments, the act at block 0115 includes the followings.

At block 01151, the user is prompted to use the projector 10 against a white wall or a plane when the face verification is unsuccessful.

At block 01152, the speckle pattern is obtained.

By using the projector 10 against a white wall or a plane, the speckle pattern can be completely projected, thereby facilitating the acquisition of a complete speckle pattern. Further, the white wall or plane can better reflect the speckle pattern, so that the obtained brightness of the central region of the speckle pattern is more accurate, and it can be accurately determined whether the zero-order beam is over proof.

It should be understood that although the various acts in the flow charts of FIGS. 6-16 and 18-30 are sequentially displayed as indicated by arrows, these acts are not necessarily performed in the order indicated by the arrows. Unless specified otherwise, the execution of these acts is not strictly limited, and may be performed in other orders. Moreover, at least some of the acts in FIGS. 6-16 and 18-30 may include a plurality of sub-steps or stages, which are not necessarily performed at the same time, but may be executed at different times. The sub-steps or stages is not necessarily executed sequentially, but may be executed alternately with other acts or at least a part of the sub-steps or stages of the other acts.

Figure 31:
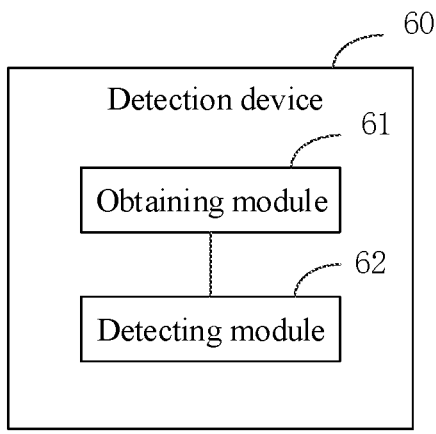
FIGS. 31 to 36 are block diagrams of a detection device of a projector according to embodiments of the present disclosure.

FIG. 31 is a schematic diagram of a detection device 60 of a projector according to an embodiment of the present disclosure. As illustrated in FIG. 31, the device 60 includes an obtaining module 61 and a detecting module 62. The obtaining module 61 is configured to acquire a speckle pattern. The speckle pattern is an image generated by irradiating laser light generated by a light source in the projector onto an object through an optical element. The detecting module 62 is configured to perform an abnormality detection on the projector according to the speckle pattern.

Figure 32:
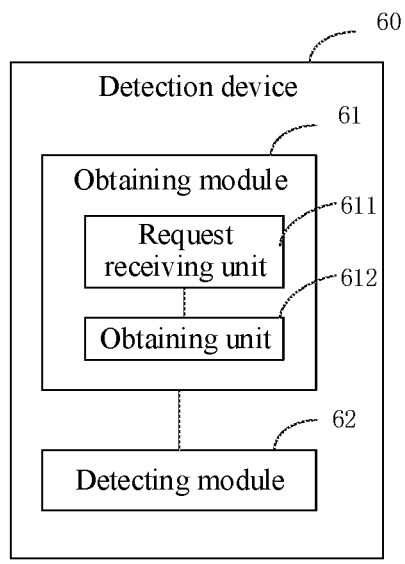

FIG. 32 is a block diagram illustrating the detection device 60 of the projector according to an embodiment. As illustrated in FIG. 32, the obtaining module 61 includes a request receiving unit 611 and an obtaining unit 612. The request receiving unit 611 is configured to receive a camera startup request. The obtaining unit 612 is configured to acquire the speckle pattern according to the camera startup request. The speckle pattern is an image generated by irradiating the laser light generated by the light source in the projector onto the object through the optical element. The detecting module 62 is configured to perform the abnormality detection on the optical element according to the speckle pattern.

In one embodiment, the detecting module 62 is further configured to acquire an infrared image for face recognition, perform a bio-assay according to the speckle pattern when the face recognition is passed, and perform the abnormality detection on the optical element according to the speckle pattern when the bio-assay is passed.

In one embodiment, the detecting module 62 is further configured to: when the bio-assay is failed, obtain a distance value between a camera and a portrait according to the speckle pattern, and when the distance value is greater than a preset distance, perform the abnormality detection on the optical element according to the speckle pattern.

In an embodiment, the detecting module 62 is further configured to determine that the optical element is abnormal when the number of continuously detected abnormalities of the speckle pattern is greater than a first preset value.

In one embodiment, the detecting module 62 is further configured to obtain a brightness value of a zero-order region of the speckle pattern, and determine that the speckle pattern is abnormal when the brightness value of the zero-order region of the speckle pattern is greater than a preset threshold.

In one embodiment, the detecting module 62 is further configured to add one to the number of abnormalities of the optical element when it is determined that the optical element is abnormal, and ban the use of the projector when the number of abnormalities of the optical element is greater than a second preset value.

The detection device of the projector may acquire the speckle pattern generated by irradiating the laser light generated by the light source in the projector through the optical element on the object according to the camera start request or obtain the speckle pattern for bio-assay when the face recognition is passed, perform the abnormality detection on the optical element according to the speckle pattern. Since the abnormality detection can be performed on the optical element according to the speckle pattern during the activation of the camera and the face recognition, the use safety can be improved.

Figure 33:
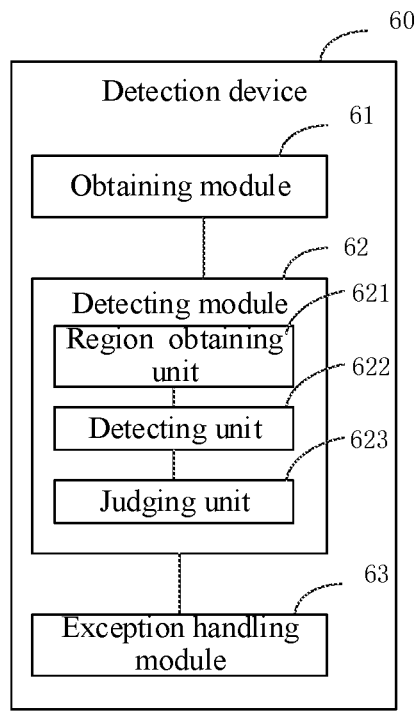

FIG. 33 is a block diagram illustrating a detection device 60 of a projector according to an embodiment. As illustrated in FIG. 33, the device 60 includes an obtaining module 61 and a detecting module 62. The obtaining module 61 is configured to acquire a speckle pattern, the speckle pattern is an image generated after laser light generated by a light source in the projector passes through an optical element. The detecting module 62 includes a region obtaining unit 621, a detecting unit 622, and a judging unit 623. The region obtaining unit 621 is configured to obtain a zero-order region in the speckle pattern and an average brightness of the zero-order region according to the speckle pattern. The zero-order region is a region with a maximum brightness. The detecting unit 622 is configured to detect an average brightness of a peripheral region of the zero-order region in the speckle pattern. The judging unit 623 is configured to determine that the optical element is abnormal when a ratio of the average brightness of the zero-order region to the average brightness of the peripheral region is greater than a first threshold.

In one embodiment, the region obtaining unit 621 is further configured to traverse a preset region of the speckle pattern by using a positioning box of a preset size, and take a region where the positioning box with a maximum average brightness is located as the zero-order region.

In one embodiment, the region obtaining unit 621 is configured to obtain a first number of peripheral regions each having a horizontal distance to the zero-order region in the speckle pattern and a vertical distance to the zero-order region in the speckle pattern no more than zero.

In one embodiment, the region obtaining unit 621 is further configured to obtain the first number of peripheral regions of the zero-order region in the speckle pattern, and the judging unit 623 is further configured to determine that the optical element is abnormal when a ratio of the average brightness of the zero-order region to an average brightness of each of the first number of peripheral regions is greater than the first threshold.

In an embodiment, the judging unit 623 is further configured to determine that the optical element is severely abnormal when the ratio of the average brightness of the zero-order region to the average brightness of the peripheral region is greater than a second threshold. The second threshold is greater than the first threshold.

In one embodiment, the detection device for the projector further includes an exception handling module 63. The exception handling module 63 is configured to add one to the number of abnormalities of the optical element when it is determined that the optical element is abnormal.

In one embodiment, the exception handling module 63 is configured to ban the use of the projector when the number of abnormalities of the optical element is greater than a predetermined number.

The above-mentioned detection device for the projector can obtain the speckle pattern generated after the laser light generated by the light source in the projector passes through the optical element, and obtain the region with the maximum brightness (i.e., the zero-order region) in the speckle pattern and the average brightness of the zero-order region, detect the average brightness of the peripheral region of the zero-order region, and determine that the optical element is abnormal when the ratio of the average brightness of the zero-order region to the average brightness of the peripheral region of the zero-order region is greater than the preset threshold. Since the optical element can be detected according to the average brightness of the zero-order region and the average brightness of the peripheral region of the zero-order region without being interfered by different brightness environments, the detection accuracy can be improved.

Figure 34:
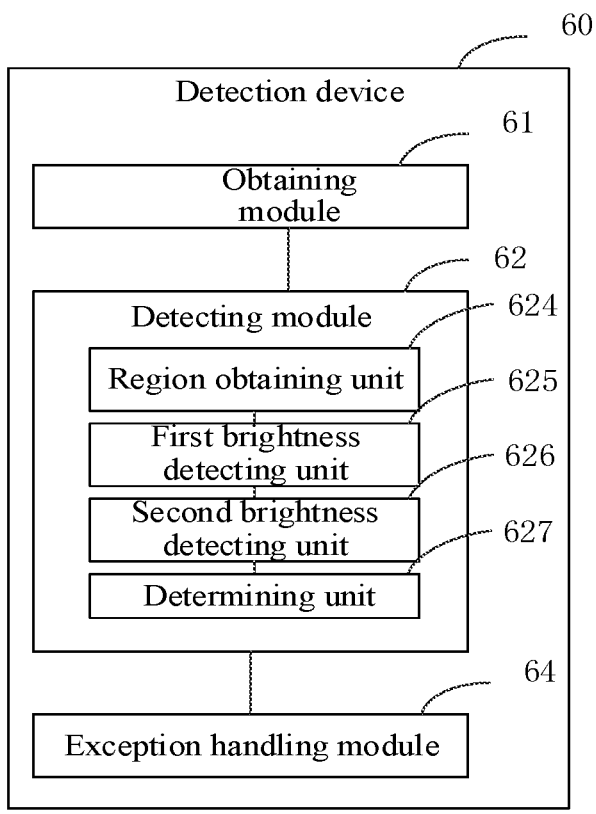

FIG. 34 is a block diagram illustrating a detection device 60 of a projector according to an embodiment. As illustrated in FIG. 34, the device 60 includes an obtaining module 61 and a detecting module 62. The obtaining module 61 is configured to obtain an infrared image and a speckle pattern. The speckle pattern is an image generated after laser light generated by a light source of the projector passes through an optical element. The detecting module 62 includes a region obtaining unit 624, a first brightness detecting unit 625, a second brightness detecting unit 626, and a determining unit 627. The region obtaining unit 624 is configured to obtain a first zero-order region in the speckle pattern and an average brightness of the first zero-order region according to the speckle pattern. The first zero-order region is a region with a maximum brightness. The first brightness detecting unit 625 is configured to detect an average brightness of a first peripheral region of the first zero-order region. The second brightness detecting unit 626 is configured to acquire an average brightness of a second zero-order region in the infrared image corresponding to the first zero-order region in the speckle pattern, and an average brightness of a second peripheral region in the infrared image corresponding to the first peripheral region in the speckle pattern. The determining unit 627 is configured to determine that the optical element is abnormal when a ratio of the average brightness of the first zero-order region to the average brightness of the first peripheral region is greater than a first preset value and a zero-order region ratio is greater than a peripheral region ratio. The zero-order region ratio is a ratio of the average brightness of the first zero-order region to the average brightness of the second zero-order region, the peripheral region ratio is a ratio of the average brightness of the first peripheral region to the average brightness of the second peripheral region.

In an embodiment, the region obtaining unit 624 is further configured to traverse a preset region of the speckle pattern by using a positioning box of a preset size, and take a region where the positioning box with a maximum average brightness is located as the first zero-order region.

In an embodiment, the first brightness detecting unit 625 is further configured to acquire a first number of peripheral regions of the first zero-order region in the speckle pattern, and the determining unit 627 is further configured to determine that the ratio of the average brightness of the first zero-order region to the average brightness of the first peripheral region is greater than the first preset value when the ratio of the average brightness of the first zero-order region to an average brightness of each of the first number of peripheral regions is greater than the first preset value.

In an embodiment, the first brightness detecting unit 625 is further configured to acquire the first number of peripheral regions each having a horizontal distance and a vertical distance to the first zero-order region of the speckle pattern no more than zero.

In an embodiment, the second brightness detecting unit 626 is further configured to acquire the second zero-order region and the second peripheral region corresponding respectively to the first zero-order region and the first peripheral region in the speckle pattern according to the infrared image, and detect the average brightness of the second zero-order region and the average brightness of the second peripheral region.

In one embodiment, the detection device 60 of the projector also includes an exception handling module 64. The exception handling module 64 is configured to add one to the number of abnormalities of the optical element when it is determined that the optical element is abnormal.

In one embodiment, the exception handling module 64 is configured to ban the use of the projector when the number of abnormalities of the optical element is greater than a predetermined number.

The detection device of the projector can obtain the infrared image and the speckle pattern generated after the laser light generated by the light source in the projector passes through the optical element, obtain the first zero-order region in the speckle pattern and the average brightness of the first zero-order region, detect the average brightness of the first peripheral region of the first zero-order region, obtain the average brightness of the second zero-order region in the infrared image corresponding to the first zero-order region in the speckle pattern and the average brightness of the second peripheral region in the infrared image corresponding to the first peripheral region, and determine that the optical element is abnormal when the ratio of the average brightness of the first zero-order region to the average brightness of the first peripheral region is greater than the first preset value and the ratio of the average brightness of the first zero-order region to the average brightness of the second zero-order region is greater than the ratio of the average brightness of the first peripheral region to the average brightness of the second peripheral region. Since the optical element can be detected according to the average brightness of the zero-order region and the average brightness of the peripheral region in the speckle pattern and the average brightness of the zero-order region and the average brightness the peripheral region in the infrared image, the detection accuracy can be improved.

Figure 35:
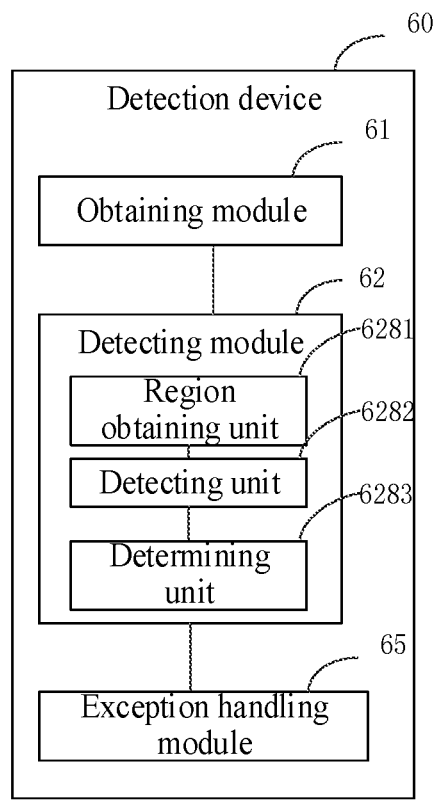

FIG. 35 is a block diagram illustrating a detection device 60 of a projector according to an embodiment. As illustrated in FIG. 35, the device 60 includes an obtaining module 61 and a detecting module 62. The obtaining module 61 is configured to obtain a speckle pattern, the speckle pattern is an image generated after laser light generated by a light source in the projector passes through the optical element. The detecting module 62 includes a region obtaining unit 6281, a detecting unit 6282, and a determining unit 6283. The region obtaining unit 6281 is configured to obtain a zero-order region in the speckle pattern according to the speckle pattern, and the zero-order region is a region with a maximum brightness. The detecting unit 6282 detects an average brightness of speckles in the zero-order region. The determining unit 6283 determines that the optical element is abnormal when the average brightness of the speckles is greater than a preset brightness value.

In one embodiment, the obtaining module 61 is further configured to obtain the speckle pattern collected according to a preset exposure time and a preset laser current.

In an embodiment, the region obtaining unit 6281 is further configured to traverse a preset region of the speckle pattern by using a positioning box of a preset size, and take a region where the positioning box with a maximum brightness value is located as the zero-order region.

In an embodiment, the region obtaining unit 6281 is further configured to obtain a brightness value of the speckle pattern in the preset region, reduce the preset region, obtain a brightness value of the reduced preset region, and take the reduced preset region as the zero-order region when a difference between the brightness value of the reduced preset region and the brightness value of the latest preset region is less than the preset threshold.

In one embodiment, the detecting unit 6282 is further configured to extract the speckles in the zero-order region, detect a brightness of each speckle in the zero-order region, and calculate the average brightness of the speckles in the zero-order region according to the brightness of each speckle.

As illustrated in FIG. 35, in one embodiment, the detection device 60 of the projector further include an exception handling module 65 for adding one to the number of abnormalities of the optical element when it is determined that the optical element is abnormal.

In one embodiment, the exception handling module 65 is further configured to ban the use of the projector when the number of abnormalities of the optical element is greater than a predetermined number.

The above-mentioned detection device 60 of the projector can acquire the speckle pattern generated after the laser light generated by the light source of the projector passes through the optical element, obtain the region with the maximum brightness of the speckle pattern, i.e., the zero-order region according to the speckle pattern, determine the average brightness of the speckles in the zero-order region, and determine that the optical element is abnormal when the average brightness of the speckles is greater than the preset brightness value. Since the optical element can be detected according to the brightness of the speckle in the zero-order region of the speckle pattern, the detection accuracy is improved.

Figure 36:
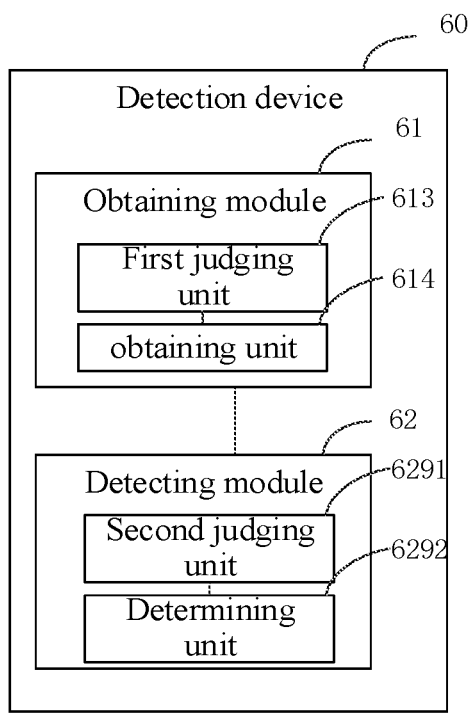

As illustrated in FIGS. 2 and 36, a detection device 60 is applicable to a projector 10, the projector 10 can be the projector 10 of any of the above embodiments or the projector in the related art. The detection device 60 includes an obtaining module 61 and a detecting module 62. The obtaining module 61 includes a first judging unit 613 and an obtaining unit 614. The detecting module 62 includes a second judging unit 6291 and a determining unit 6292. The first judging unit 613 is configured to determine whether a face verification is successful. The obtaining unit 614 is configured to obtain a speckle pattern when the face verification is unsuccessful. The second judging unit 6291 determines whether a brightness of a central region of the speckle pattern is within a preset brightness range. The determining unit 6292 is configured to determine that the projector 10 is abnormal when the brightness of the central region is beyond the preset brightness range.

Figure 37:
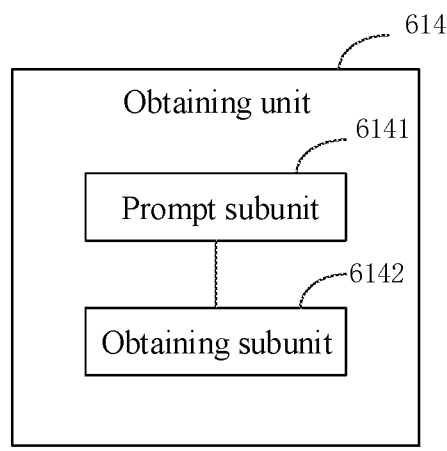
FIG. 37 is a block diagram of an obtaining unit according to an embodiment of the present disclosure.

As illustrated in FIG. 37, in some embodiments, the obtaining unit 614 includes a prompt subunit 6141 and an obtaining subunit 6142. The prompt subunit 6141 is configured to prompt the user to use the projector 10 against a white wall or a plane when the face verification is unsuccessful. The obtaining subunit 6142 is configured to obtain the speckle pattern.

The division of modules in the above-mentioned detection device 60 of the projector is for illustrative purposes only. In other embodiments, the detection device 60 of the projector may be divided into different modules as needed to complete all or part of functions of the above-described detection device 60 of the projector.

For the specific limitation to the detection device 60 of the projector, reference may be made to the limitation to the detection method of the projector described above, and details will not be described herein again. The various modules in the above-described detection device 60 of the projector may be implemented in a whole or in part by software (e.g. an application), hardware (e.g. a processor), and a combination thereof. Each of the above modules may be embedded in or independent of a processor in an electronic device, or may be stored in a memory in the electronic device in a software format, so that the processor may call the above modules to perform operations corresponding to the above modules.

The various modules in the detection device 60 of the projector provided in the embodiments of the present disclosure may be implemented in a form of a computer program. The computer program can run on a terminal or a server. The program modules of the computer program can be stored on the memory of the terminal or server. When the computer program is executed by a processor, the method described in the embodiments of the present disclosure can be implemented.

Figure 38:
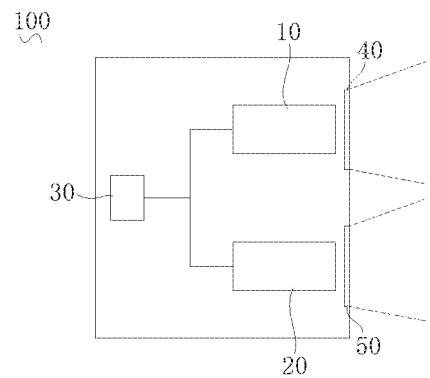
FIG. 38 is a schematic diagram of an image acquisition device according to an embodiment of the present disclosure.
Figure 39:
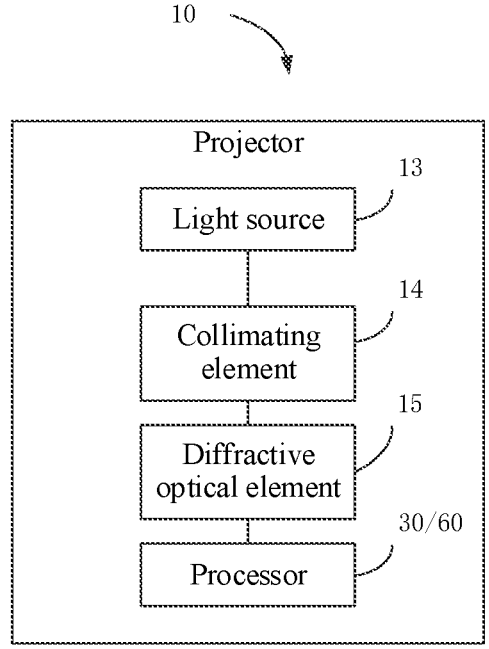
FIG. 39 is a block diagram of a projector according to an embodiment of the present disclosure.

As illustrated in FIGS. 38 and 39, the image acquisition device 100 includes the projector 10 of any of the above embodiments and an image collector 20. A projection window 40 corresponding to the projector 10 and an acquisition window 50 corresponding to the image collector 20 may be provided on the image acquisition device 100. The projector 10 is configured to project the speckle pattern to a target space through the projection window 40, and the image collector 20 is configured to collect the speckle pattern through the acquisition window 50. In one example, the laser light projected by the projector 10 is infrared light and the image collector 20 is an infrared camera. The projector 10 or the image acquisition device 100 includes a detection device 60. The detection device 60 can be the processor 30.

In some embodiments, the detection device 60 or the processor 30 acquires the speckle pattern, it can be understood that detection device 60 or the processor 30 acquires the speckle pattern collected by the image collector 20.

Figure 40:
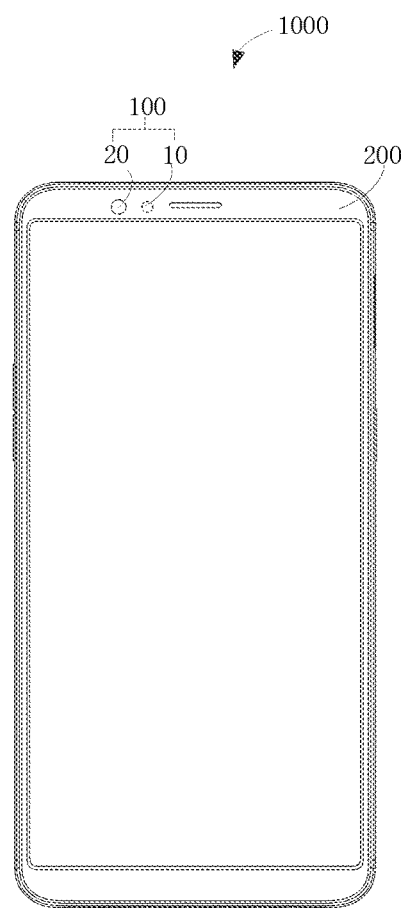
FIG. 40 is a schematic diagram of an electronic device according to an embodiment of the present disclosure.

As illustrated in FIG. 40, the electronic device 1000 of the embodiments of the present disclosure includes the image acquisition device 100 of any of the above embodiments and a housing 200. The electronic device 1000 may be a mobile phone, a tablet computer, a laptop computer, a game machine, a head display device, an access control system, a teller machine, etc., which is not limited herein. The image acquisition device 100 is disposed in the housing 200 and exposed from the housing 200 to obtain the speckle pattern. The housing 200 can provide protection against dust, water, and protect the image acquisition device 100 from falling off. The housing 200 is provided with a hole corresponding to the image acquisition device 100 to allow light to enter in or exit out the housing 200.

The embodiments of the present disclosure also provide a computer readable storage medium. One or more nonvolatile computer readable storage mediums contain computer executable instructions, that when executed by one or more processors, causes the one or more processors to perform the detection method of the projector.

A computer program product contains instructions, that when run on a computer, cause the computer to perform a detection method of the projector.

Figure 41:
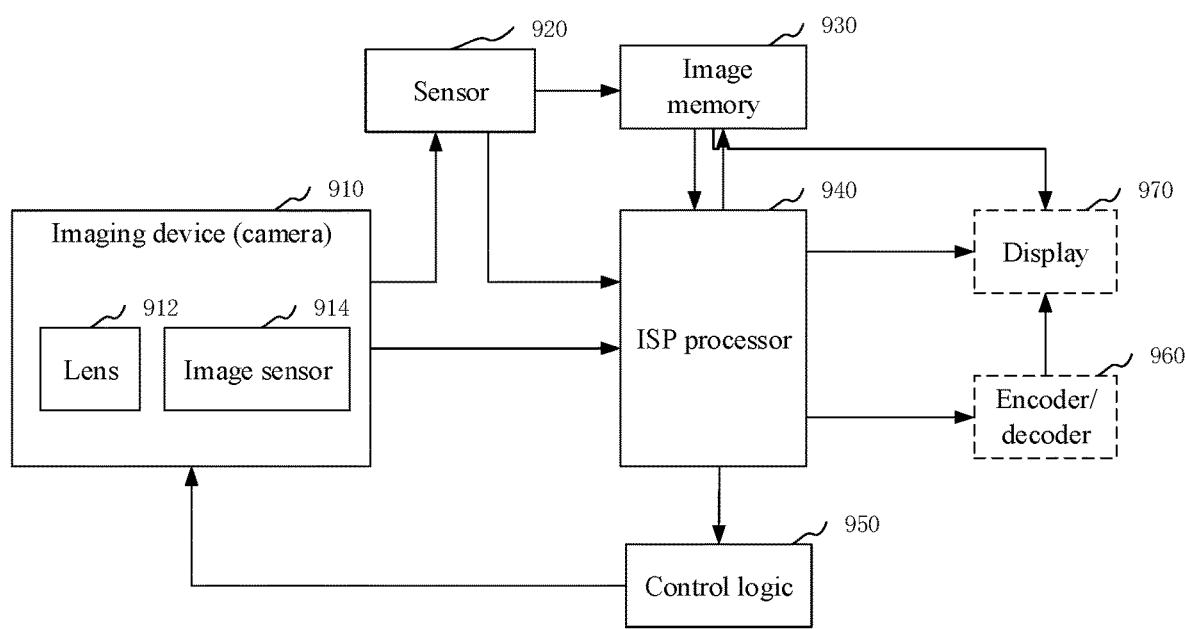
FIG. 41 is a schematic diagram of an image processing circuit according to an embodiment of the present disclosure.

The embodiments of the present disclosure further provide an electronic device. The above electronic device includes an image processing circuit, and the image processing circuit can be implemented by using hardware and/or software assembly, and can include various processing units defining an ISP (Image Signal Processing) pipeline. FIG. 41 is a schematic diagram of an image processing circuit in one embodiment. As illustrated in FIG. 41, for convenience of explanation, only various aspects of the image processing technique related to the embodiments of the present disclosure are illustrated.

As illustrated in FIG. 9, the image processing circuit includes an ISP processor 940 and a control logic 950. The image data captured by an imaging device 910 is first processed by the ISP processor 940, the ISP processor 940 analyzes the image data to capture image statistics for determining one or more control parameters of the imaging device 910. The imaging device 910 can include a camera having one or more lenses 912 and an image sensor 914. The image sensor 914 may include a color filter array (such as a Bayer filter), the image sensor 914 may acquire light intensity and wavelength information captured with each imaging pixel of the image sensor 914 and provide a set of the original image data that may be processed by the ISP processor 940. A sensor 920, such as a gyroscope, can provide acquired image processing parameters, such as anti-shake parameters, to the ISP processor 940 based on an interface type of the sensor 920. An interface of the sensor 920 may utilize a SMIA (Standard Mobile Imaging Architecture) interface, other serial or parallel camera interfaces, or a combination of the above.

In addition, the image sensor 914 can also transmit the original image data to the sensor 920, the sensor 920 can provide the original image data to the ISP processor 940 based on the interface type of the sensor 920, or store the original image data into an image memory 930.

The ISP processor 940 processes the original image data per pixel in a variety of formats. For example, each image pixel can have a bit depth of 8, 10, 12, or 14 bits, and the ISP processor 940 can perform one or more image processing operations on the original image data, and collect statistical information about the image data. Image processing operations can be performed with the same or different bit depth precision.

The ISP processor 940 can also receive the image data from the image memory 930. For example, the interface of the sensor 920 transmits the original image data to the image memory 930, and then the original image data is provided to the ISP processor 940 for processing. The image memory 930 may be part of a memory device, a storage device, or a separate dedicated memory in the electronic device, and may include DMA (Direct Memory Access) features.

When receiving the original image data from the interface of the image sensor 914, the interface of the sensor 920, or the image memory 930, the ISP processor 940 can perform one or more image processing operations, such as time domain filtering. The processed image data can be sent to the image memory 930 for additional processing prior before being displayed. The ISP processor 940 receives the processed data from the image memory 930 and performs image data processing on the processed data in an original domain and in RGB and YCbCr color spaces. The image data processed by the ISP processor 940 can be output to the display 970 for viewing by the user and/or further processing by a graphics engine or a GPU (Graphics Processing Unit). Additionally, the output of the ISP processor 940 can also be sent to image memory 930, and the display 970 can read image data from the image memory 930. In one embodiment, the image memory 930 can be configured to implement one or more frame buffers. Additionally, the output of the ISP processor 940 can be sent to an encoder/decoder 960 to encode/decode image data. The encoded image data can be saved and decompressed before being displayed on the display 970. The encoder/decoder 960 may be implemented by a CPU or GPU or coprocessor.

The statistics determined by the ISP processor 940 can be sent to the control logic 950. For example, the statistics may statistics of the include image sensor 914, such as auto exposure, auto white balance, auto focus, flicker detection, black level compensation, lens 912 shading correction, and the like. The control logic 950 can include a processor and/or a microcontroller that executes one or more routines, such as firmware, and one or more routines can determine control parameters of the imaging device 910 and the ISP processor 940 based on received statistics. For example, the control parameters of the imaging device 910 may include control parameters of the sensor 920 (e.g. gain, integral time for exposure control, anti-shake parameter), camera flash control parameters, control parameters of the lens 912 (e.g. focal length for focus or zoom), or a combination of these parameters. The ISP control parameters may include a gain level and a color correction matrix for automatic white balance and color adjustment (e.g. during RGB processing), and the lens 912 shading correction parameter.

In the embodiments of the present disclosure, the electronic device performs the detection method of the projector in the embodiments of the present disclosure when the computer program stored in the memory is executed.

Any reference to the memory, storage, database or other medium used herein may include non-volatile and/or volatile memory. Suitable non-volatile memories can include read only memory (ROM), programmable ROM (PROM), electrically programmable ROM (EPROM), electrically erasable programmable ROM (EEPROM), or flash memory. Volatile memory can include random access memory (RAM), which acts as an external cache. By way of illustration and not limitation, RAM is available in a variety of formats, such as static RAM (SRAM), dynamic RAM (DRAM), synchronous DRAM (SDRAM), double data rate SDRAM (DDR SDRAM), enhanced SDRAM (ESDRAM), sync link DRAM (SLDRAM), rambus direct RAM (RDRAM), direct rambus dynamic RAM (DRDRAM), and rambus dynamic RAM (RDRAM).

The above embodiments illustrate merely some implementations of the present disclosure, which are described in details but are not construed to limit the scope of the present disclosure. It should be pointed that, for those skilled in the art, without departing from the principle of the present disclosure, various changes and improvements may be made, which are covered by the protection scope of the present disclosure. Therefore, the protection scope of the present disclosure is according to the appended claims.

What is claimed is:

1. A detection method of a projector, comprising:
obtaining a speckle pattern comprising: receiving a camera startup request; and obtaining the speckle pattern based on the camera startup request, the speckle pattern being an image generated by irradiating laser light generated by a light source in the projector onto an object through an optical element;
obtaining a collected infrared image for face recognition;
performing a bio-assay based on the speckle pattern, when the face recognition is passed; and
performing an abnormality detection on the optical element based on the speckle pattern, when the bio-assay is passed.

2. The method of claim 1, further comprising:
obtaining a distance value between a camera and a portrait based on the speckle pattern, when the bio-assay is failed; and
performing the abnormality detection on the optical element based on the speckle pattern, when the distance value is greater than a preset distance.

3. The method of claim 1, wherein performing the abnormality detection on the optical element based on the speckle pattern, comprises:
determining that the optical element is abnormal, when a number of continuously detected abnormalities of the speckle pattern is greater than a first preset value.

4. The method of claim 3, wherein the abnormality of the speckle pattern is detected by:
obtaining a brightness value of a zero-order region in the speckle pattern; and
determining that the speckle pattern is abnormal, when the brightness value of the zero-order region in the speckle pattern is greater than a preset threshold.

5. The method of claim 3, further comprising:
adding one to the number of abnormalities of the optical element, when it is determined that the optical element is abnormal.

6. The method of claim 5, further comprising
banning a use of the projector, when the number of abnormalities of the optical element is greater than a second preset value.

7. The method of claim 1, wherein performing the abnormality detection on the projector based on the speckle pattern, comprises:
obtaining a zero-order region in the speckle pattern and an average brightness of the zero-order region based on the speckle pattern, the zero-order region being a region with a maximum brightness;
detecting an average brightness of a peripheral region of the zero-order region in the speckle pattern; and
determining that the optical element is abnormal, when a ratio of the average brightness of the zero-order region to the average brightness of the peripheral region is greater than a first threshold.

8. The method of claim 7, wherein obtaining the zero-order region in the speckle pattern and the average brightness of the zero-order region based on the speckle pattern, comprises:
traversing a preset region of the speckle pattern by using a positioning box of a preset size; and
taking a region where the positioning box with a maximum average brightness is located as the zero-order region.

9. The method of claim 7, further comprising:
obtaining a first number of peripheral regions of the zero-order region in the speckle pattern; and
determining that the optical element is abnormal, when a ratio of the average brightness of the zero-order region to an average brightness of each of the first number of peripheral regions is greater than the first threshold.

10. The method of claim 9, wherein for each peripheral region of the first number of peripheral regions, a horizontal distance between the peripheral region and the zero-order region in the speckle pattern is no more than 0, and a vertical distance between the peripheral region and the zero-order region in the speckle pattern is no more than 0.

11. The method of claim 7, further comprising:
determining that the optical element is severely abnormal, when the ratio of the average brightness of the zero-order region to the average brightness of the peripheral region is greater than a second threshold, the second threshold being greater than the first threshold.

12. The method of claim 1, wherein,
obtaining the speckle pattern comprises: obtaining an infrared image and the speckle pattern; and
performing the abnormality detection on the projector based on the speckle pattern, comprises: obtaining a first zero-order region in the speckle pattern and an average brightness of the first zero-order region based on the speckle pattern, the first zero-order region being a region with a maximum brightness; detecting an average brightness of a first peripheral region of the first zero-order region in the speckle pattern; obtaining an average brightness of a second zero-order region in the infrared image and corresponding to the first zero-order region in the speckle pattern and obtaining an average brightness of a second peripheral region in the infrared image and corresponding to the first peripheral region in the speckle pattern; and determining that the optical element is abnormal, when a ratio of the average brightness of the first zero-order region to the average brightness of the first peripheral region is greater than a first preset value and a zero-order region ratio is greater than a peripheral region ratio; wherein, the zero-order region ratio is a ratio of the average brightness of the first zero-order region to the average brightness of the second zero-order region, and the peripheral region ratio is a ratio of the average brightness of the first peripheral region to the average brightness of the second peripheral region.

13. The method of claim 1, wherein performing the abnormality detection on the projector based on the speckle pattern, comprises:
obtaining a zero-order region in the speckle pattern based on the speckle pattern, the zero-order region being a region with a maximum brightness;
detecting an average brightness of speckles in the zero-order region; and
determining that the optical element is abnormal, when the average brightness of the speckles is greater than a preset brightness value.

14. The method of claim 13, wherein obtaining the zero-order region in the speckle pattern based on the speckle pattern, comprises:
obtaining a brightness value of the speckle pattern in the preset region;
reducing the preset region, and obtaining a brightness value of the reduced preset region; and
taking the reduced preset region as the zero-order region, when a difference between the brightness value of the reduced preset region and the brightness value of a latest preset region is less than a preset threshold.

15. The method of claim 1, wherein,
obtaining the speckle pattern comprises: determining whether a face verification is successful; and obtaining the speckle pattern, when the face verification is unsuccessful; and
performing the abnormality detection on the projector according to the speckle pattern, comprises: determining whether a brightness of a central region of the speckle pattern is within a preset brightness range; and determining that the projector is abnormal, when the brightness of the central region is beyond the preset brightness range.

16. The method of claim 15, wherein the obtaining the speckle pattern when the face verification is unsuccessful, comprises:
prompting a user to use the projector against a white wall or a plane when the face verification is unsuccessful; and
obtaining the speckle pattern.

17. A projector, comprising:
a light source, configured to emit laser light;
a collimating element, configured to collimate the laser light;
an optical element, configured to diffract the laser light collimated by the collimating element to generate a speckle pattern; and
a processor, configured to determine whether a face verification is successful, obtain the speckle pattern when the face verification is unsuccessful, determine whether a brightness of a central region of the speckle pattern is within a preset brightness range, and determine that the projector is abnormal when the brightness of the central region is beyond the preset brightness range.

18. An electronic device, comprising a memory and a processor, wherein the memory is stored with a computer program, that when executed by the processor, causes the processor to perform a detection method of a projector, comprising:
receiving a camera startup request;
obtaining a speckle pattern based on the camera startup request, the speckle pattern being an image generated by irradiating laser light generated by a light source in the projector onto an object through an optical element;
obtaining a collected infrared image for face recognition;
performing a bio-assay based on the speckle pattern, when the face recognition is passed; and
performing an abnormality detection on the optical element based on the speckle pattern, when the bio-assay is passed.

* * * * *